(12) United States Patent
Ruchonnet

(10) Patent No.: US 7,778,115 B2
(45) Date of Patent: Aug. 17, 2010

(54) DEPTH MEASURING DEVICE FOR WATCHES, AND WATCHES INCORPORATING SUCH A MEASURING DEVICE

(75) Inventor: Jean-Francois Ruchonnet, Mont-sur-Rolle (CH)

(73) Assignee: Richemont International S.A., Villars-sur-Glane (CH)

( * ) Notice: Subject to any disclaimer, the term of this patent is extended or adjusted under 35 U.S.C. 154(b) by 305 days.

(21) Appl. No.: 12/097,542

(22) PCT Filed: Dec. 12, 2006

(86) PCT No.: PCT/IB2006/003562

§ 371 (c)(1),
(2), (4) Date: Jun. 16, 2008

(87) PCT Pub. No.: WO2007/069028

PCT Pub. Date: Jun. 21, 2007

(65) Prior Publication Data

US 2008/0304366 A1    Dec. 11, 2008

(30) Foreign Application Priority Data

Dec. 15, 2005 (CH) .................................. 01983/05
Feb. 8, 2006 (CH) .................................. 00205/06

(51) Int. Cl.
*G04B 47/06* (2006.01)
*G01F 23/00* (2006.01)
*G01L 7/00* (2006.01)

(52) U.S. Cl. ........................... 368/11; 368/101; 73/291; 73/700; 73/744

(58) Field of Classification Search .................. 368/10, 368/11, 97, 100, 110–113; 73/291, 300, 73/384, 700, 744, 865.1; 702/138, 139
See application file for complete search history.

(56) References Cited

U.S. PATENT DOCUMENTS

| 3,696,610 A | * | 10/1972 | Charbonnier ................... 368/1 |
| 3,777,573 A | | 12/1973 | Alinari |
| 3,869,916 A | * | 3/1975 | Ojima ......................... 73/300 |
| 3,910,117 A | * | 10/1975 | Wicklund ..................... 73/291 |
| 4,056,010 A | | 11/1977 | Alinari |
| 4,533,256 A | | 8/1985 | Ostendorf |

(Continued)

FOREIGN PATENT DOCUMENTS

CH    448 901 A    8/1967

(Continued)

*Primary Examiner*—Vit W Miska
(74) *Attorney, Agent, or Firm*—Young & Thompson

(57) ABSTRACT

The depth measuring device for a diving watch with a chronograph mechanism, includes a plunger moved by external pressure through a rolling membrane against the action of a return element. The plunger acts on cams belonging to a circular slide mounted in a casing ring. The movement of the slide is transmitted by a gear train to a depth needle and to a dead needle. A pressure sensing device has a sliding plunger mounted inside the winding button. This plunger acts on a control device for automatically starting and stopping the chronograph mechanism. A locking device is used to lock and release the control device and displays a diving flag in the released position. The gear chain displays a safety flag at a predetermined depth. A resetting device allows the various mechanisms and devices to be reset to zero.

12 Claims, 30 Drawing Sheets

U.S. PATENT DOCUMENTS

| | | |
|---|---|---|
| 5,983,728 A | 11/1999 | Weng |
| 6,385,134 B1 | 5/2002 | Lange et al. |
| 6,754,137 B1 * | 6/2004 | Bourquin et al. .............. 368/11 |
| 6,791,903 B2 * | 9/2004 | Germiquet et al. ............ 368/11 |
| 6,931,348 B2 * | 8/2005 | Furuta et al. ................ 702/138 |
| 7,242,639 B2 * | 7/2007 | Blondeau et al. .............. 368/11 |
| 2004/0047242 A1 * | 3/2004 | Germiquet et al. ............ 368/11 |

FOREIGN PATENT DOCUMENTS

| | | |
|---|---|---|
| DE | 15 23 923 A1 | 10/1969 |
| DE | 27 49 298 A1 | 5/1979 |
| EP | 0 685 711 A2 | 12/1995 |
| EP | 1 008 512 | 6/2000 |

* cited by examiner

DEPTH MEASURING DEVICE FOR WATCHES, AND WATCHES INCORPORATING SUCH A MEASURING DEVICE

The present invention refers to a depth measuring device for watches, and particularly for diving watches, having a sensor mechanism for measuring the external pressure.

Considerable problems arise when incorporating such a depth measuring device into existing watchcases without modifying the movement.

Today very few manufacturers of movements exist, and watch fabrication is considerably centralized, which makes adding or modifying any functions of a watch such as those of a diving watch described hereinafter a difficult task. It is the aim of the invention, therefore, to realize a depth measuring device that can be installed in different types and models of watches while respecting the design realized by the manufacturer of the watchcase supposed to receive the measuring device and the movement.

In the functions of a diving watch it is sometimes necessary, on the other hand, to pick up the pressure in order to trigger at a given depth an action that could be the chronograph mechanism or any other function. With the device according to the present invention, this requirement can also be taken care of.

The device according to the present invention is characterized to this end by the characteristics appearing in claim 1, and in particular by the fact that the sensor mechanism includes at least one piston able to be displaced by the external pressure against the action of a restoring element, where the displacement of the piston is a function of the external pressure and is transmitted by transmission elements to at least one organ of the watch.

Thanks to these characteristics the depth measuring device is readily incorporated into a case of existing watches without having to modify the case or the movement. The characteristics just cited further provide a pressure sensor of small size yet still able to control various functions of the watch such as the chronograph mechanism.

In addition, these characteristics yield an elevated precision of the depth measurement and a considerable longevity while securing a simple construction and small space requirements.

One advantageous embodiment is characterized in that the transmission elements comprise a circular slide pivoting relative to a casing ring arranged around the watch movement as well as at least one gear train where the piston or pistons are subject to the external pressure, and are fitted in such a way that a rotation of the circular slide is produced, the slide cooperating via said gear train with at least one pressure indicator organ.

One thus obtains a compact, reliable, and highly precise construction.

According to a variant, the device comprises at least two pistons mounted on the casing ring so as to slide in a plane essentially parallel to the principal plane of the watch, while the displacement of the pistons under the influence of the external pressure produces a corresponding rotation of the circular slide.

With these characteristics one can obtain a construction of great longevity and slight wear of the parts.

According to a preferred embodiment, the device comprises a piston mounted so as to slide in an axial direction perpendicular to the principal plane of the watch between the movement and the back of the watch, while at least one ramp-shaped cam cooperates with a cam follower that is fitted between the piston and the circular slide in such a way that an axial displacement of the piston produces a corresponding rotation of the circular slide.

Thanks to these characteristics the measuring device takes up little space and is particularly easily incorporated into pre-existing watches and cases. The ramp-shaped cams facilitate a possible profile modification for the purposes of its being adapted to the displacement desired for the hands that indicate the depth.

Advantageously, the restoring element consists of a conical or Belleville washer arranged between the casing ring and the piston.

This type of restoring element offers the advantages of occupying little space, securing a considerable restoring force that will be able to cause gears to function, and offering a linear response between pressure and deformation of the washer.

Preferably, the device comprises a rolling sleeve diaphragm serving as a sealing element arranged between the piston and the back that is provided with openings for the water.

These characteristics yield a rational, shorter, and less bulky construction while reducing frictions and securing an elevated precision.

Favorably, the gear train comprises a first mobile part that is arranged to drive a second coaxial mobile part while the external pressure increases, and to be disengaged from this second mobile part when the external pressure decreases, the first mobile part cooperating with a first indicator organ for the instantaneous external pressure and the second mobile part cooperating with a second indicator organ for the maximum external pressure that has been attained, this second mobile part being integral with a locking wheel cooperating with a one-directional locking organ retaining the second indicator organ against the action of a restoring element.

One thus obtains a highly precise, double indication of depth.

One advantageous embodiment is characterized in that the first mobile part is engaged with a first central pinion that is integral with a depth hand constituting the first indicator organ, the first central pinion being engaged with a first return wheel, and in that the second mobile part consists of a toothed sector arranged so as to cooperate with a driving element of the first mobile part, only while the external pressure increases, the toothed sector being engaged with a second central pinion that is coaxial with the first central pinion and integral with a maximum-depth hand that forms the second indicator organ, and with a wheel cooperating with a unidirectional locking organ such as a pawl that can be disengaged, this second central pinion being engaged with a second return wheel that is designed to secure the zero resetting of the maximum-depth hand under the action of a return spring.

These characteristics yield a very precise and reliable construction with double indication of depth.

Advantageously, the device comprises a first display device where a first flag can be made to appear in a first window, this first display device comprising a pivoting arm holding the first flag and subject to the action of a spring that secures a bistable function of the arm with an active position in which the flag is displayed, and a passive position in which the flag is retracted, the change in positions of this arm between the two positions being produced by two pins arranged on the first mobile part.

Thanks to the characteristics just named, one obtains a safety flag or danger flag being displayed in an immediate fashion, at a depth and pressure that have been predetermined.

According to a preferred embodiment, the sensor mechanism comprises a crown piston mounted so as to slide within the crown of the watch, and act upon at least one organ of the watch.

In the functions of a diving watch, it is sometimes necessary to pick up the pressure at a given depth in order to start and stop a chronograph mechanism or any other function. The difficulty involved when realizing and incorporating such a pressure sensor function resides above all in the limited volume that is available. The chronograph mechanism must be able to be triggered automatically by an impulse provided between 0 and −5 meters when descending (note that in this specification the values of depth are indicated, either by a negative number or by their absolute values). It must equally well be automatically stopped by the same impulse between −5 meters and the surface when reascending. A reading then is possible after leaving the water. The solution to this problem has been made possible thanks to the characteristics cited above.

According to a preferred embodiment, the crown piston is displaced by the external pressure along the crown's axis against the action of a return spring in order to activate and/or deactivate via a transmission mechanism at least one function of the watch, such as that of starting and stopping a chronograph mechanism.

Thanks to this arrangement one obtains a construction of the sensor mechanism that takes up very little space.

Favorably, the crown piston is integral with a cam comprising two ramps arranged in such a way that the transmission mechanism receives a first command impulse while the external pressure increases, and a second command impulse while the external pressure decreases.

One thus obtains a precise function of the sensor and a considerable force for realizing the automatic control of the chronograph start and stop.

Advantageously, the measuring device comprises a locking device for locking and releasing the transmission mechanism, this locking device comprising a locking lever arranged so as to lock the transmission mechanism in a first position, and releasing the transmission mechanism in a second position, the locking device comprising a release lever that can be actuated by a user and is linked through linking elements with the locking lever so as to displace this lever from the first to the second position.

Thanks to these characteristics, the user has the choice between an automatic and a manual start and stop of the chronograph, depending on the type of diving envisaged.

Favorably, the measuring device comprises a second display device for a diving flag, this second display device comprising an arm integral with the locking lever, this arm being provided with the diving flag and set up so that the diving flag is visible in a second window of the dial in the second position of the locking lever but is turned away from this window in the first position of the locking lever.

On thus obtains a precise diving display device that takes up limited space and is readily incorporated into a diving watch.

According to an advantageous embodiment the crown comprises a crown tube fixed on the watchcase, a cylindrical wall of the crown being disposed so as to face the outside of the crown tube, the crown piston being mounted inside this crown tube and crown in order to slide along a rod extension that is integral with the crown while at least one gasket secures the water tightness of the crown's interior, and openings are provided in the crown so that the water may displace the piston.

Thanks to these characteristics one obtains a very rational precise, and reliable construction.

Preferably, the gasket consists of a rolling sleeve diaphragm arranged between crown and piston.

These characteristics admit a shorter construction, an important decrease of the frictions, and a higher precision.

Advantageously, the measuring device comprises a zero-resetting device arranged
   so as to act upon the locking organ that is unidirectional and can be released, in order to produce the zero resetting of the maximum-depth hand,
   so as to insert the toothed sector between the first flag and the first window during the diving descent,
   so as to act upon a zero-resetting organ of the chronograph mechanism,
   so as to act upon the locking lever in such a way that this lever will be shifted from its second position to its first position in which the transmission mechanism is locked, and
   so as to turn the diving flag away from the second window.

Thanks to these characteristics one obtains a reliable and complete zero resetting that needs only a small number of component parts.

The invention also relates to a watch incorporating a depth measuring device such as defined above.

Other advantages will become apparent from the characteristics expressed in the dependent claims, and from the description disclosing hereinafter the invention in greater detail with the aid of drawings that schematically and by way of example represent three embodiments.

FIGS. 1 to 7 refer to a first embodiment,
FIG. 1 is a perspective view of this first embodiment.
FIGS. 2 to 4 are perspective views of segments of this first embodiment.
FIGS. 5a and 5b represent a segment of the transmission elements in two positions, that is, during the reascent (FIG. 5a) and during the descent (FIG. 5b).
FIG. 6 illustrates the casing ring in a perspective, sectioned view.
FIG. 7 represents an axial section of a piston.
FIGS. 8 to 16 refer to the second embodiment.
FIGS. 8 and 10 are lateral views in two positions.
FIGS. 9 and 11 represent views in axial section in these two positions.
FIGS. 12 and 13 are perspective views illustrating the second embodiment as installed on a watch movement.
FIG. 14 is an enlarged view of a particularity A in FIG. 13.
FIG. 15 illustrates the transmission mechanism in a lateral view.
FIG. 16 is an enlarged view of a particularity B in FIG. 15.
FIGS. 17 to 35 refer to the third embodiment.
FIG. 17 is a front view of a diving watch with chronograph mechanism incorporating this third embodiment.
FIGS. 18 and 19 are exploded perspective views of this third embodiment from above and from below.
FIG. 20 is a perspective view of the piston and of the Belleville washer.
FIG. 21 is a view in transverse section of the watch illustrated in FIG. 17.
FIGS. 22 to 25 represent a segment of this third embodiment seen from below in four positions, that is, the initial or rest position (FIG. 22), during the release prior to diving (FIG. 23), during the descent (FIG. 24), and at the end of descent (FIG. 25).
FIGS. 26 and 27 represent a segment of this third embodiment seen from above at the end of the descent and after the resetting to zero corresponding to the initial or rest position.

A first embodiment is described while referring to FIGS. 1 to 7.

Figure 1:
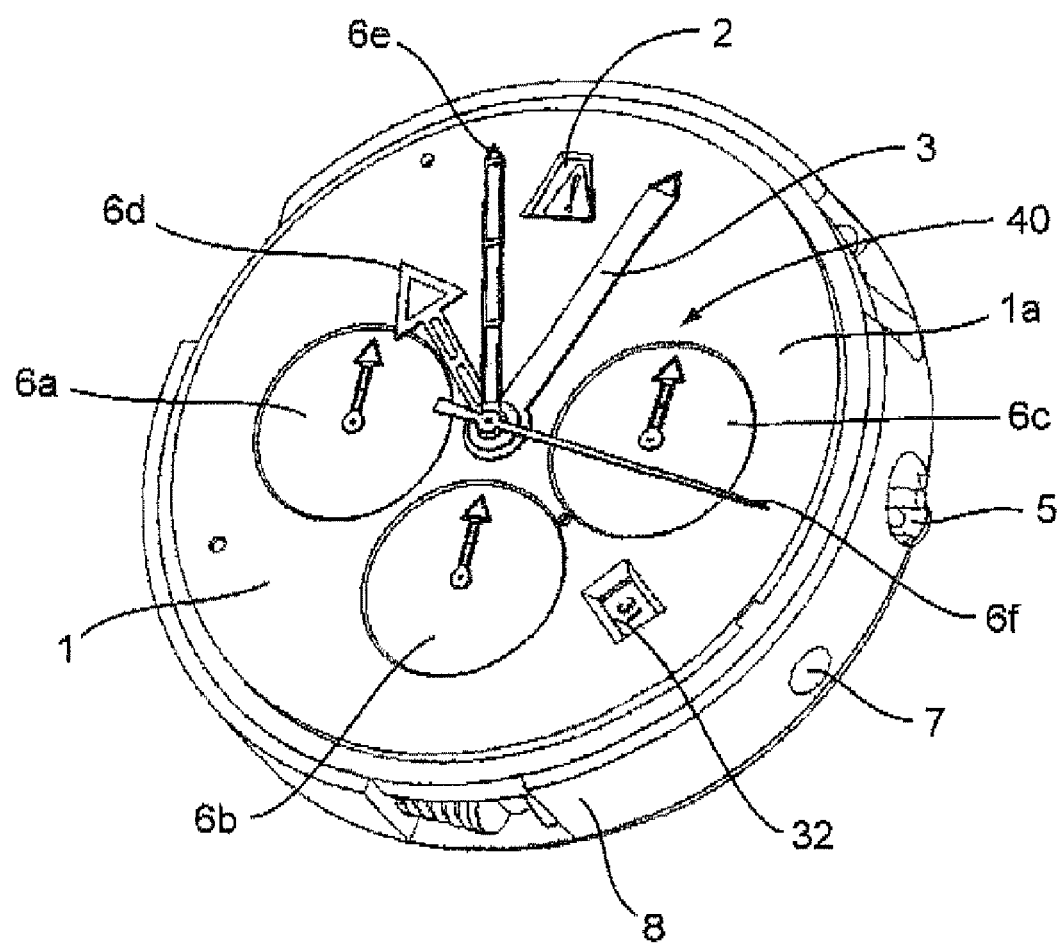

FIG. 1 illustrates in perspective a chronograph movement 1 surrounded by the casing ring 8 and comprising a diving depth measuring device 40. Above the casing ring and movement, dial 1a comprises displays 6a, 6b, 6c associated with three small hands: at 9 o'clock the counter of 30 minutes 6a, at 6 o'clock the counter of 12 hours 6b, and at 3 o'clock the counter of the permanent seconds 6c. In the middle of the dial one finds the three hands of the hours 6d the minutes 6e, and the seconds counter 6f. A fourth hand 3 joins the former three in order to provide the depth indication. At 4 o'clock, the date indication can be read in a window 32. At 12 o'clock another window 2 provides a safety indication by a triangle saying that a stop must be respected when reascending and arriving at −5 meters. Passage holes 7 for the zero-resetting push button and a passage hole 5 for the crown are machined into the casing ring 8.

Figure 2:
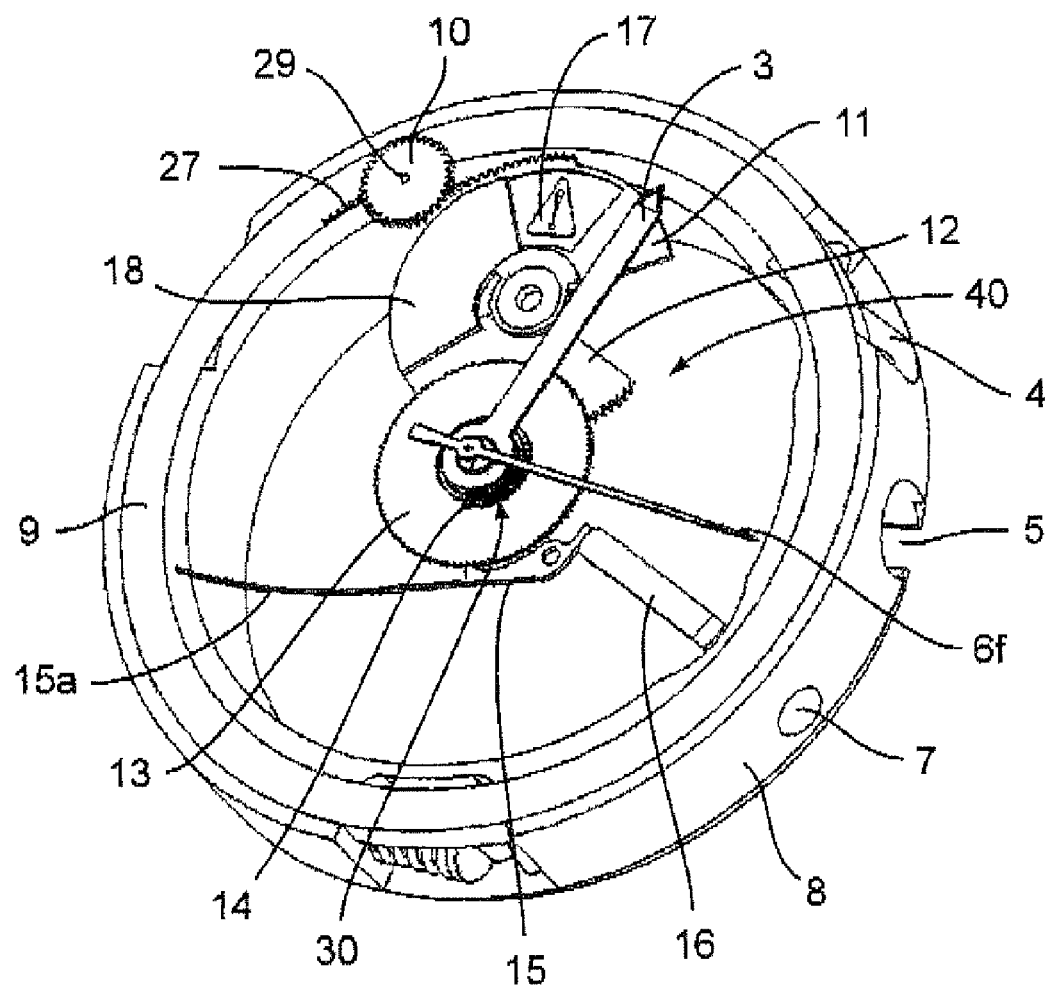
Figure 3:
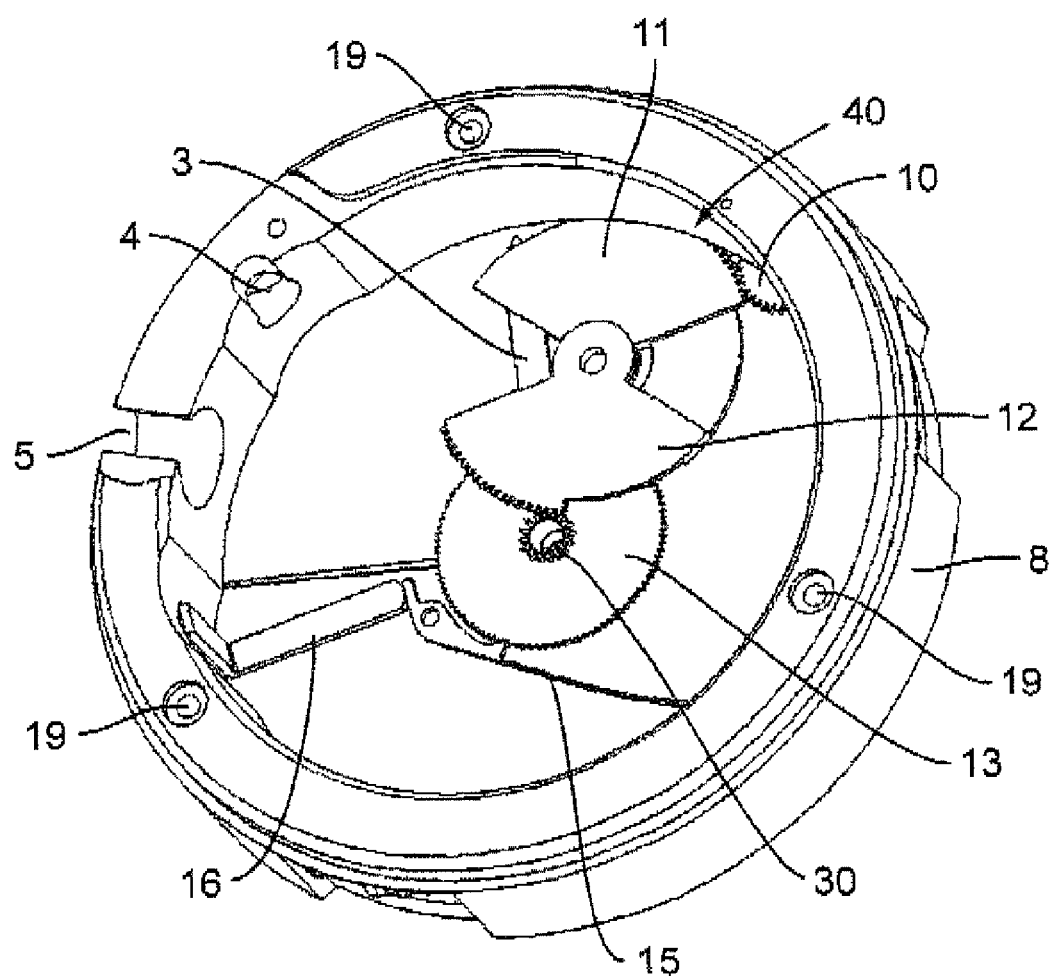

FIG. 2 shows the casing ring 8 with the dial being omitted. This view illustrates the transmission mechanics between a circular slide 9 and the depth hand 3. The casing ring 8 is provided with a circular groove within which this circular slide 9 can move. A rack 27 is cut out from this slide in order to drive a pinion 29 that is integral with a small wheel 10. This wheel drives a set of two toothed sectors 11 and 12 by which a central pinion 30 that is illustrated in FIG. 3 is rotated so as to yield the depth indication. This central pinion 30 is fitted with a toothed wheel 13 cooperating with a pawl 15 so as to block this central pinion 30 during every forward step of the toothed wheel 13. Pawl 15 is provided with a spring blade 15a as an extension securing perfect contact in the bottom of the teeth. Zero resetting is secured by a lever 16 pushing the pawl 15. Lever 16 is actuated by a zero-resetting push button set up in bored passage 7.

FIG. 3 represents the set of components of FIG. 2 rotated through 180° so as to show the lower side of the casing ring 8. Three bores with counterbores 19 are machined into this side in order to receive O-rings 28 (see FIG. 7) securing water tightness between the back of the chronograph case and the casing ring. FIG. 3 shows once more the central pinion 30 driven by the wheel sector 12 that in turn is driven by the small wheel 10 via the wheel sector 11.

Figure 4:
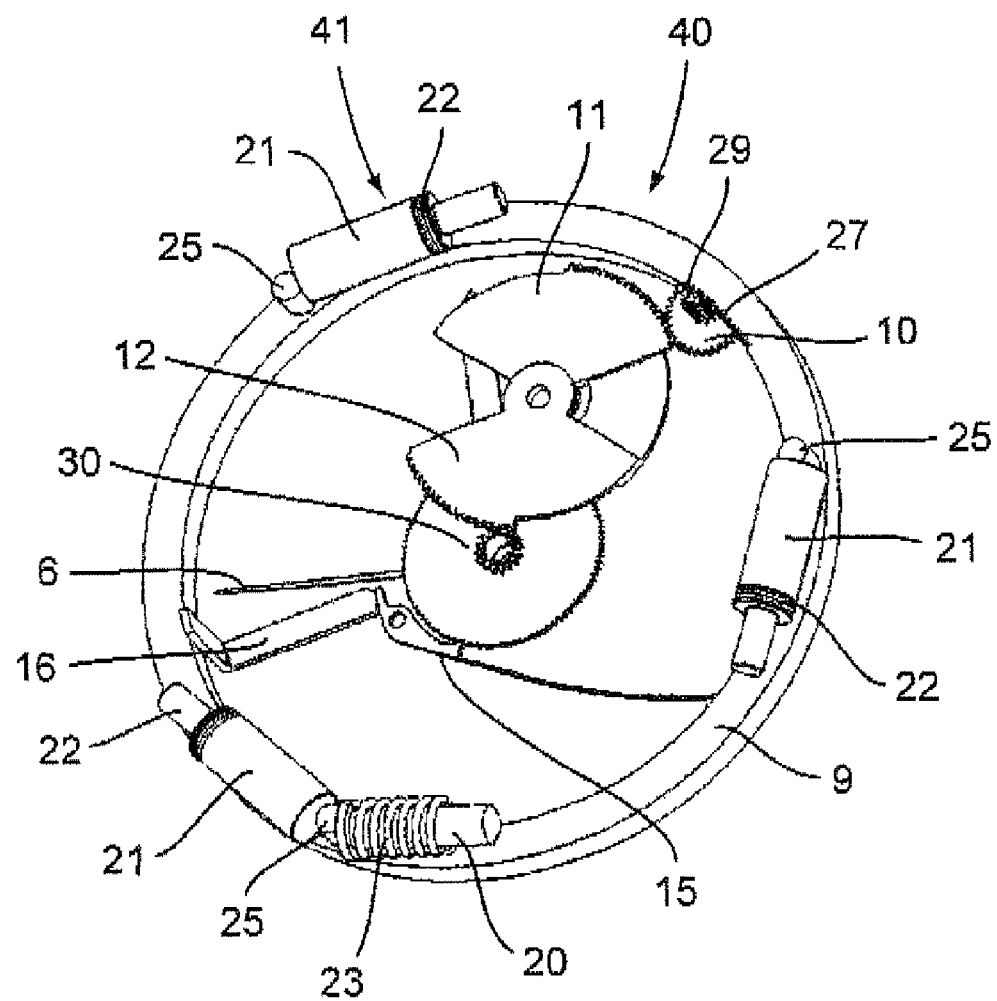

FIG. 4 corresponds to FIG. 3, except that here the casing ring is omitted. Slide 9 is readily seen, and comprises three studs 25 driven into its upper face. These studs are provided to secure uptake of the push of three pistons 21 that are made impervious to the external pressure by O-rings 22 so as to form a sensor mechanism 41 measuring the external pressure. While pistons 21 push against studs 25, a rotation of slide bar 9 occurs, and pinion 29 is solicited via the rack 27 producing a rotation of the small wheel 10 and of the gear train down to the central pinion 30. Slide 9 is pulled back by a pusher piston 20 associated with a spring 23. The displacement of pistons 21 and slide 9 are a function of the external diving pressure transmitted by the transmission elements to hand 3.

Figure 5A:
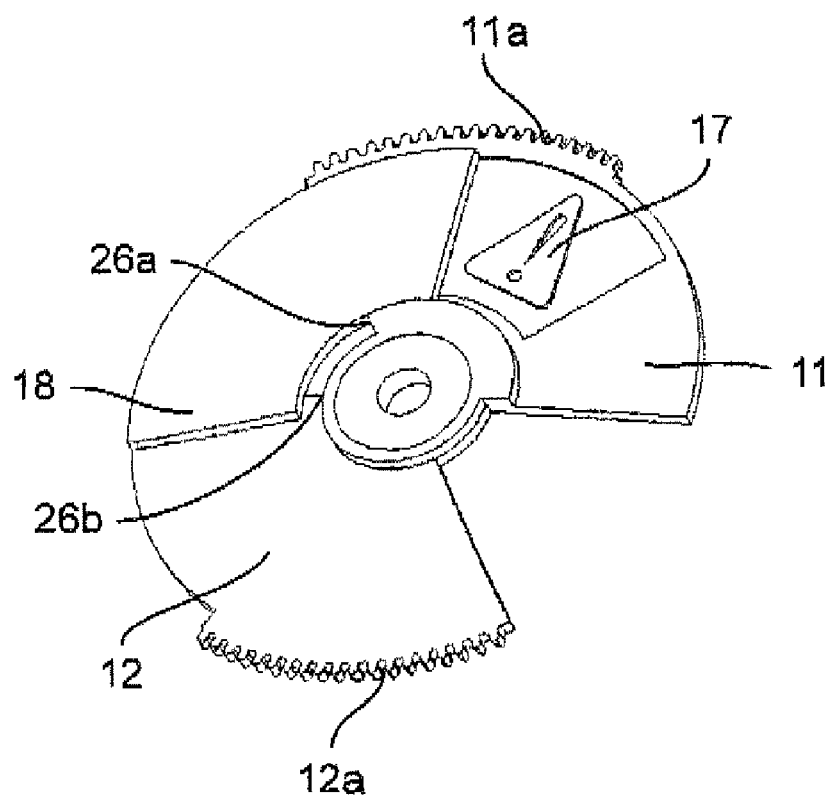
Figure 5B:
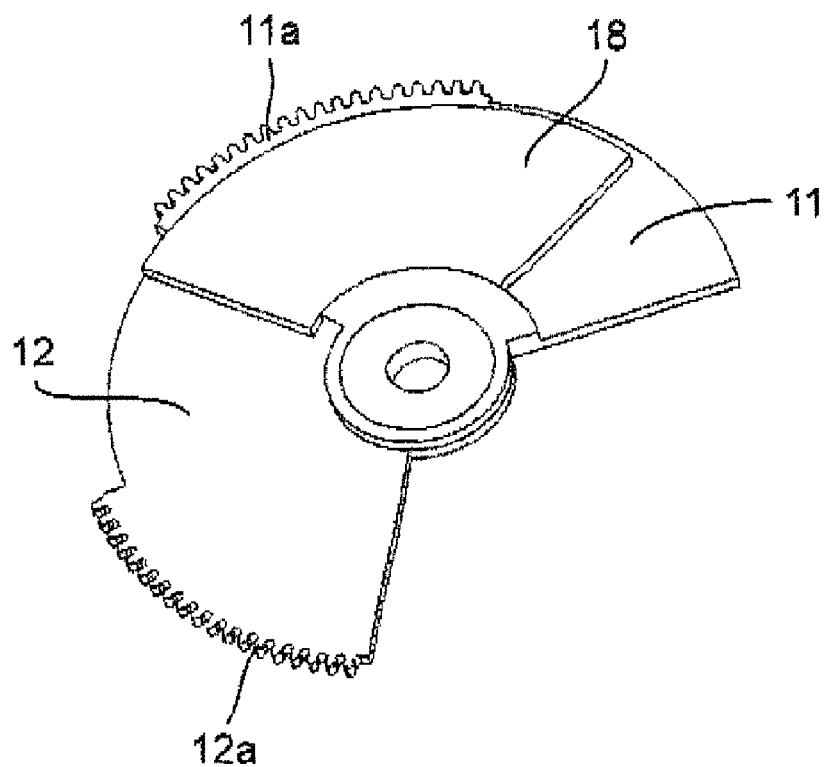

FIGS. 5a and 5b represent the set of two coaxial toothed sectors 11 and 12. Toothed sector 11 has teeth 11a on its periphery that engage with the small wheel 10. An angular sector appears above this toothed sector 11 liberating the view of a marker 17 in the shape of a triangle intended to indicate danger. During the start of diving and of the depth hand 3, toothed sectors 11 and 12 take up the mutual arrangement illustrated in FIG. 5b. The first sector 11 rotates the second sector 12 exclusively in one direction when the external pressure increases. The two blanks 26a and 26b of these sectors touch one another, thus hiding the marker 17 "danger" with a shutter 18 of sector 12, while driving the set in order to bring about a rotation of pinion 30 and hand 3 indicating the depth. For this reason the toothed wheel 13 also rotates, and produces the tooth-by-tooth jumping of pawl 15. During reascent of the diver, the pressure decreases, slide 9 rotates in the opposite direction, sector 11 turns back, and sector 12 that is held back by the central pinion 30 engaged with teeth 12a of this sector remains locked onto one tooth of pawl 15. In this way the toothed wheel 13 and the pawl 15 constitute means of locking that can be released but are intended to lock the depth hand 3 during any decrease in external pressure so that this hand will indicate the maximum depth attained during a dive. When the toothed sector 11 approaches the value of 5 meters below the surface, the marker 17 "danger" appears in window 2 of FIG. 1. The diver is alerted that he should make a stop. When arriving at the surface the diving time is read on the dial for the seconds via hand 6f, and for the minutes through minutes counter 6a located at 9 o'clock.

During the zero resetting produced by the push-piece sitting in bore 7, the toothed sector 12 that has been released by pawl 15 is moved back toward the other sector through the effect of a spring 14 (FIG. 2). Shutter 18 of sector 12 will then hide the marker 17 "danger" that is located beneath window 2.

Figure 6:
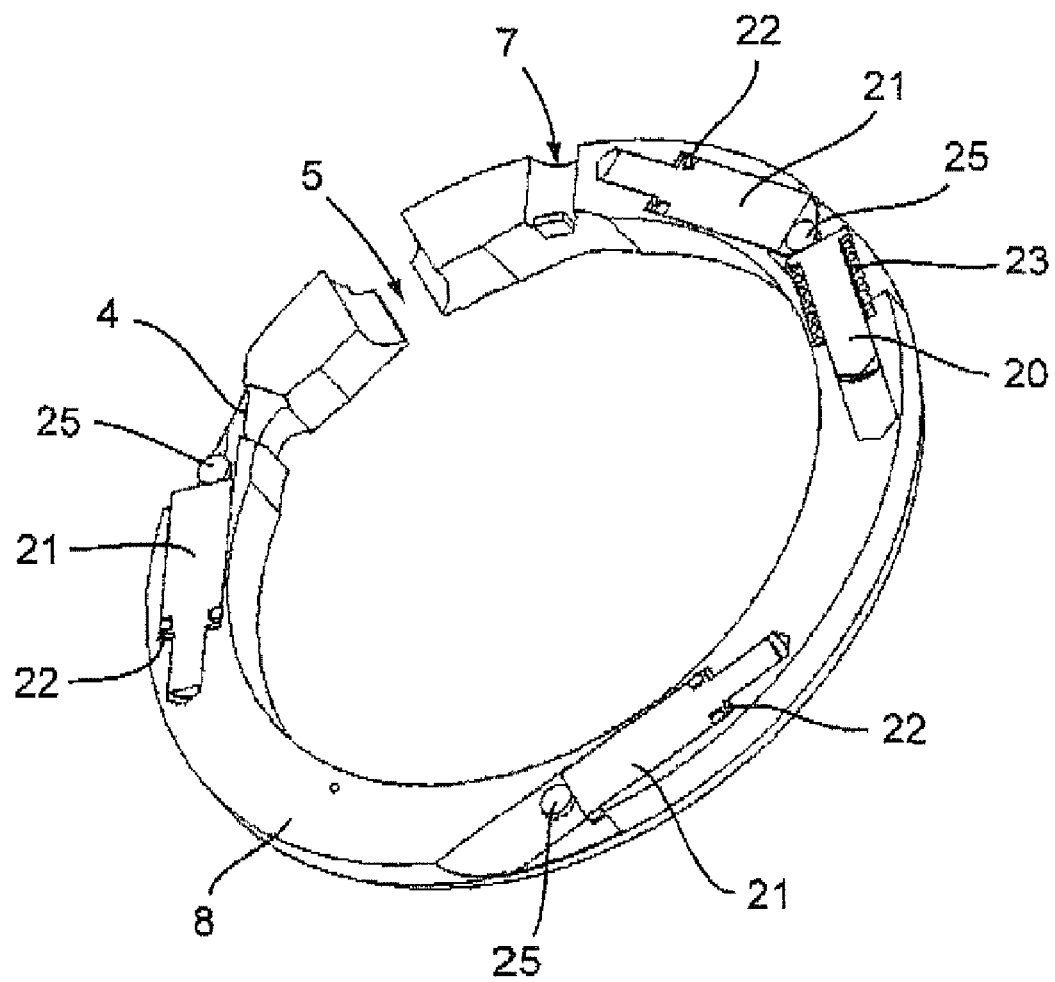

FIG. 6 shows the casing ring 8 sectioned along the axes of pistons 21. One distinguishes here bore 5 for the crown and bores 4 and 7 for the chronograph and zero-resetting push-pieces. In the same sectioning plane the push piston 20 is housed in a hole that also is situated in the sectioning plane. Spring 23 of this push piston 20 secures the return of pistons 21 and slide 9 during reascent. Pistons 21 are mounted slidingly on casing ring 8 in a plane that is essentially parallel to the principal plane of the watch. The displacement of pistons 21 under the influence of the external pressure produces a corresponding rotation of slide 9.

Figure 7:
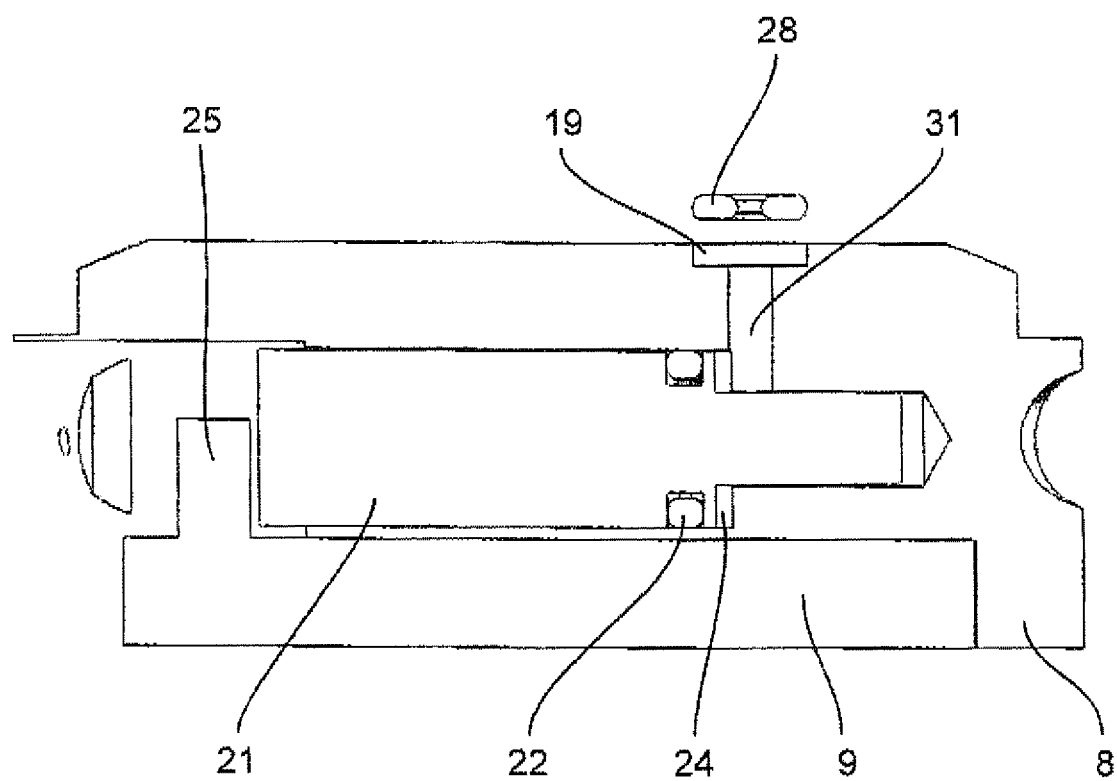

FIG. 7 shows a section that is perpendicular to the earlier plane passing through the axes of pistons 21. The water tightness between the back of the chronograph case and the casing ring 8 is secured by the O-ring 28 that sits in the counterbore 19. The external pressure goes through bore 31, then into a chamber 24. The water tightness between chamber 24 and piston 21 is secured by the O-ring 22. When the pressure has been set up in chamber 24, then piston 21 displaces the projection 25 so as to rotate slide 9 by some degrees until equilibrium has been attained with spring 23 of push piston 20.

It must also be noted that the chronograph will start when the pressure difference between the surroundings of the watch or chronograph and their interior amounts to 0.5 atmospheres or 5 meters of depth. The start mechanism for the chronograph situated in the crown pushes a push-piece located at 2 o'clock on the dial through a reduction gears as will be explained hereinafter.

The invention that has been described above thus allows a mechanical depth measuring device to be realized that is integrated into a mechanical chronograph watch with which the depth of the dive can be measured and the time of the dive can also be monitored by the start and stop of the chronograph. The pressure pickup device is integrated into the case without any change of the movement.

The device according to the invention can thus be installed into different watch models while fully respecting the design perfected by the manufacturer of the case.

The principle of pressure sensing consists of a set of several pistons 21 pushing a circular slide 9 and producing a rotative movement proportional to the quantity being measured. A gear train device transmits the information to a hand 3 situated in the middle of the dial and indicating the value of diving depth. A second device 13 to 15 enables the hand indicating the depth, to be blocked at the highest value, and to maintain it up to the surface. A third device 11, 17, 18 allows the diver during reascent to be given notice that at a predetermined distance from the surface he must respect his decompression stop, by information appearing in window 2 of the watch. The time of the dive finally is provided permanently to him by the triggering of the chronometer that happens as soon as the descent starts, at a given depth. At the end of the dive, one merely must push the zero-resetting push button in order to reset the chronometer to its primary function of indicating time or working as chronometer.

The second embodiment illustrated in FIGS. 8 to 16 consists of a depth measuring device 100 comprising a sensor mechanism 141 integrated into a crown 103 of a mechanical chronograph and cooperating with a control device 143 comprising a transmission mechanism 144 set to trigger the chronometer during the submarine diving descent, and then stop it during reascent at the surface in order to monitor the time.

Actually, it sometimes is necessary in the functions of a diving watch to sense the pressure at a certain depth in order to trigger the chronometer or any other function. The difficulty resides above all in the volume available for realizing such a function. It must be possible to trigger the chronometer automatically by an impulse between 0 and −5 meters. During reascent, it must be automatically stopped by the same impulse between −5 meters and the surface. A reading will thus be possible upon leaving the water, then the device is reset to zero by an impulse onto the zero-resetting push-piece, which is provided manually. The automatic trigger is realized by a piston device detecting the external pressure a device that is housed in the space within the winding crown.

Figure 8:
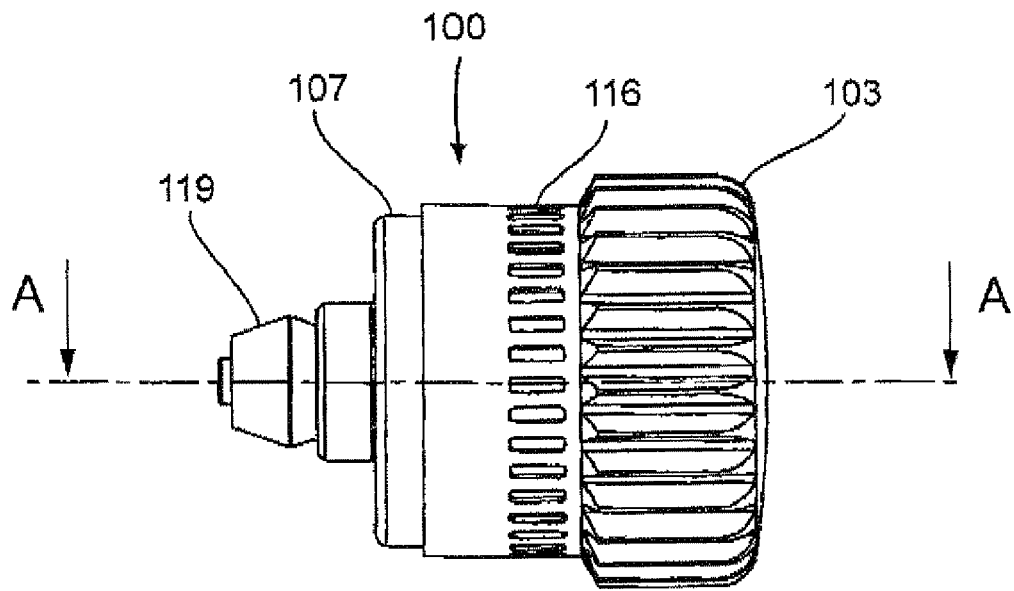
Figure 14:
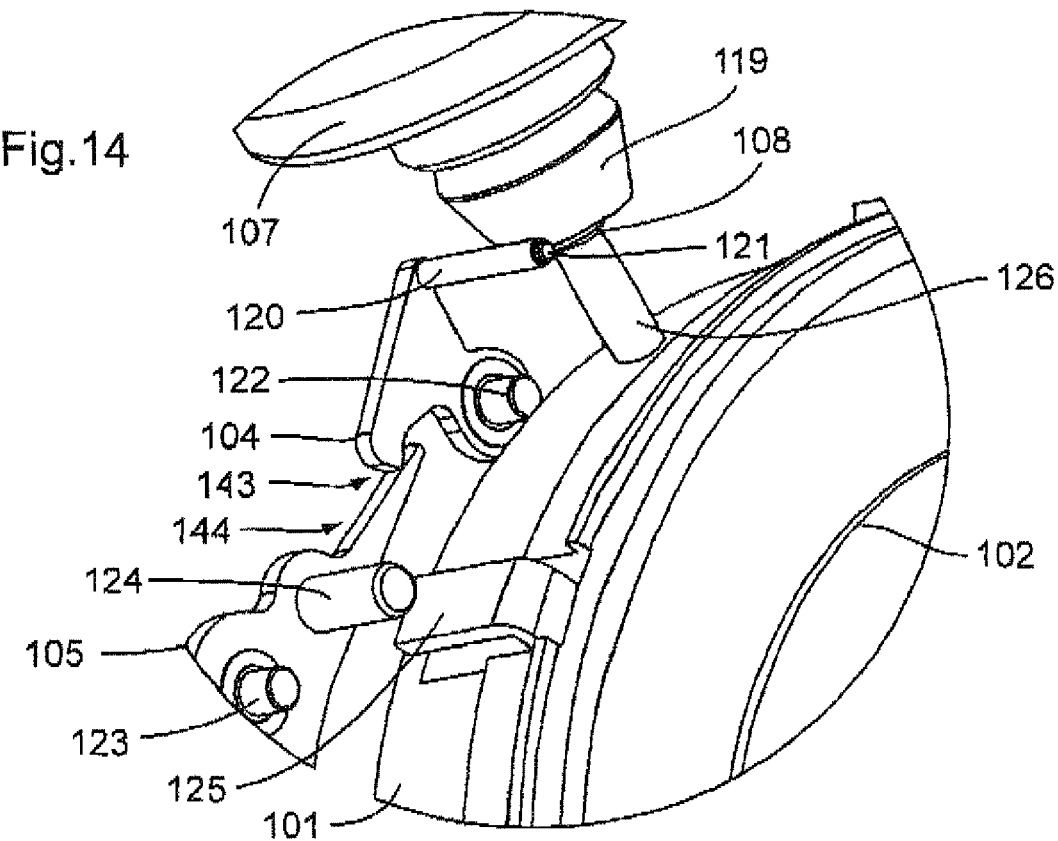

FIG. 8 shows the general shape of the crown. One discerns crown 103 with its teeth. Openings 116 let water pass during a dive. A crown tube 107 is welded to the middle of the watch. At the exit from the crown group, a stone cut in the shape of a double cone constitutes a cam 119 with two ramps having the purpose of securing the displacement of a first lever 104 coming out and entering back in (FIG. 14).

Figure 9:
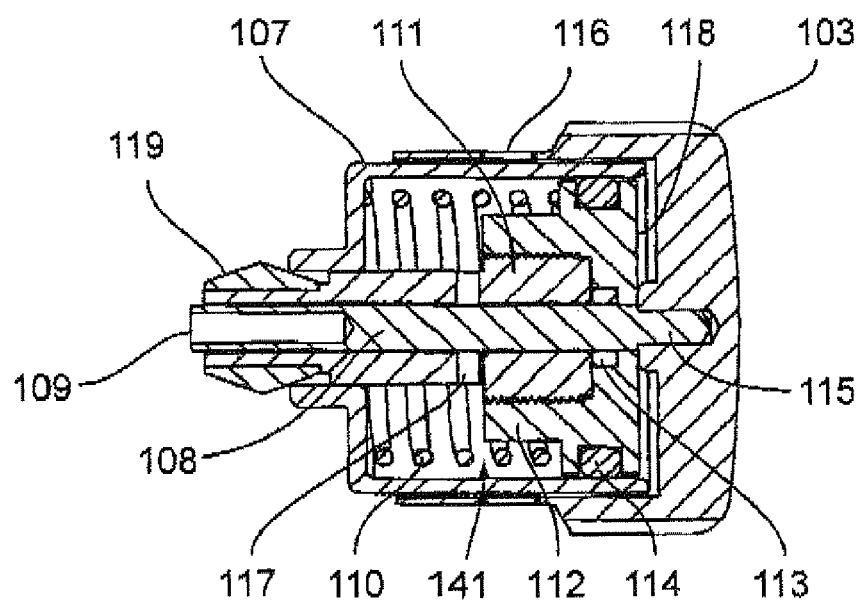

FIG. 9 shows this pressure device in a detailed sectioned view. By means of an attachment 115 driven in, crown 103 is made integral with a rod extension 108. This rod extension 108 is intended to be screwed into a winding stem 126 (FIG. 14) of the movement by means of a thread 109. It secures the functions of rotation and longitudinal movement of the winding stem. A set of parts comprising a piston rod 111 and a piston 112 with O-rings 113 and 114 is mounted slidingly onto rod extension 108 and winding stem 126, and produces the longitudinal displacement of cam 119 sitting at the end of piston rod 111 so as to constitute a sensor mechanism 141 for the external pressure. Crown tube 107 welded to the watchcase serves as guiding means for piston 112 inside and crown 103 outside.

The water pressure thus passes through the openings 116 between crown 103 and crown tube 107 into a chamber 118. Under the action of the pressure exerted during the descent, the set of piston and piston rod moves toward the left in FIG. 9, so as to compress a spring 110 and at the same time push against a cam 119.

For an equilibration of the pressures inside the watchcase and inside the crown on the side of spring 110, a hole 117 is machined through piston rod 111. Sufficient play is provided between rod extension 108 and crown tube 107 to secure continuity of the air flow.

Figure 10:
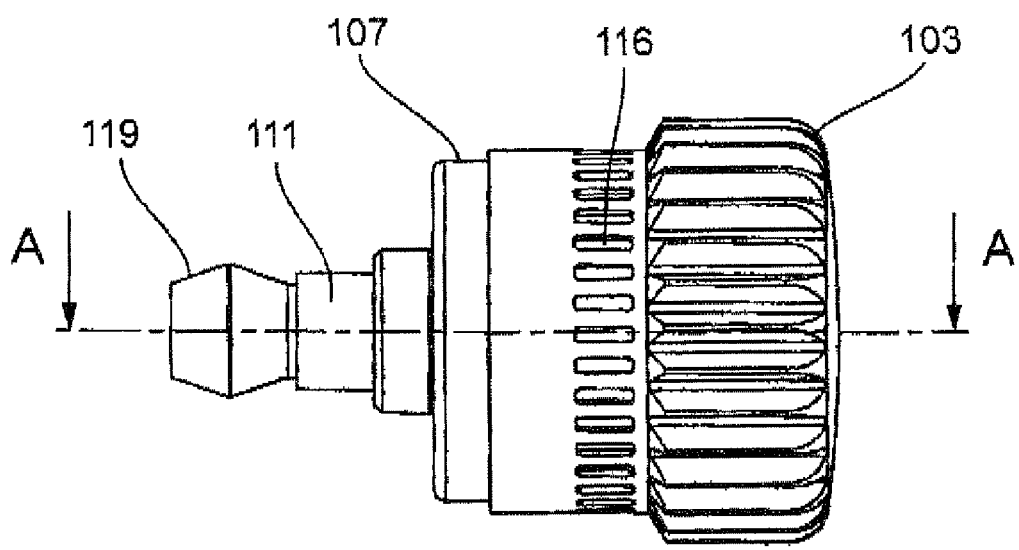
Figure 11:
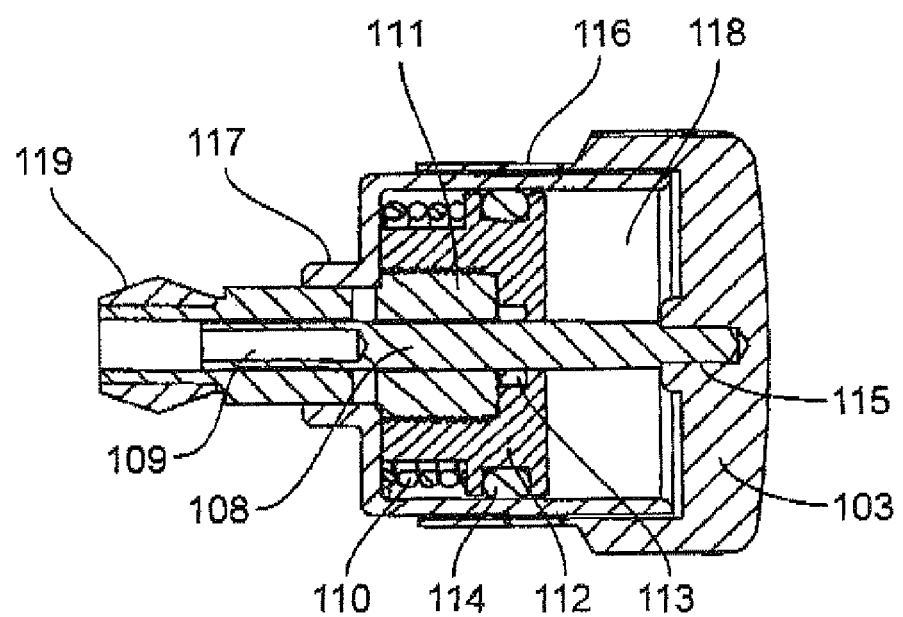

FIGS. 10 and 11 correspond to FIGS. 8 and 9, but the measuring device 100 is in the position of pressures beyond 5 meters of depth. By moving to the left in these figures, piston 112 has compressed spring 110. Cam 119 is fully outside.

Figure 12:
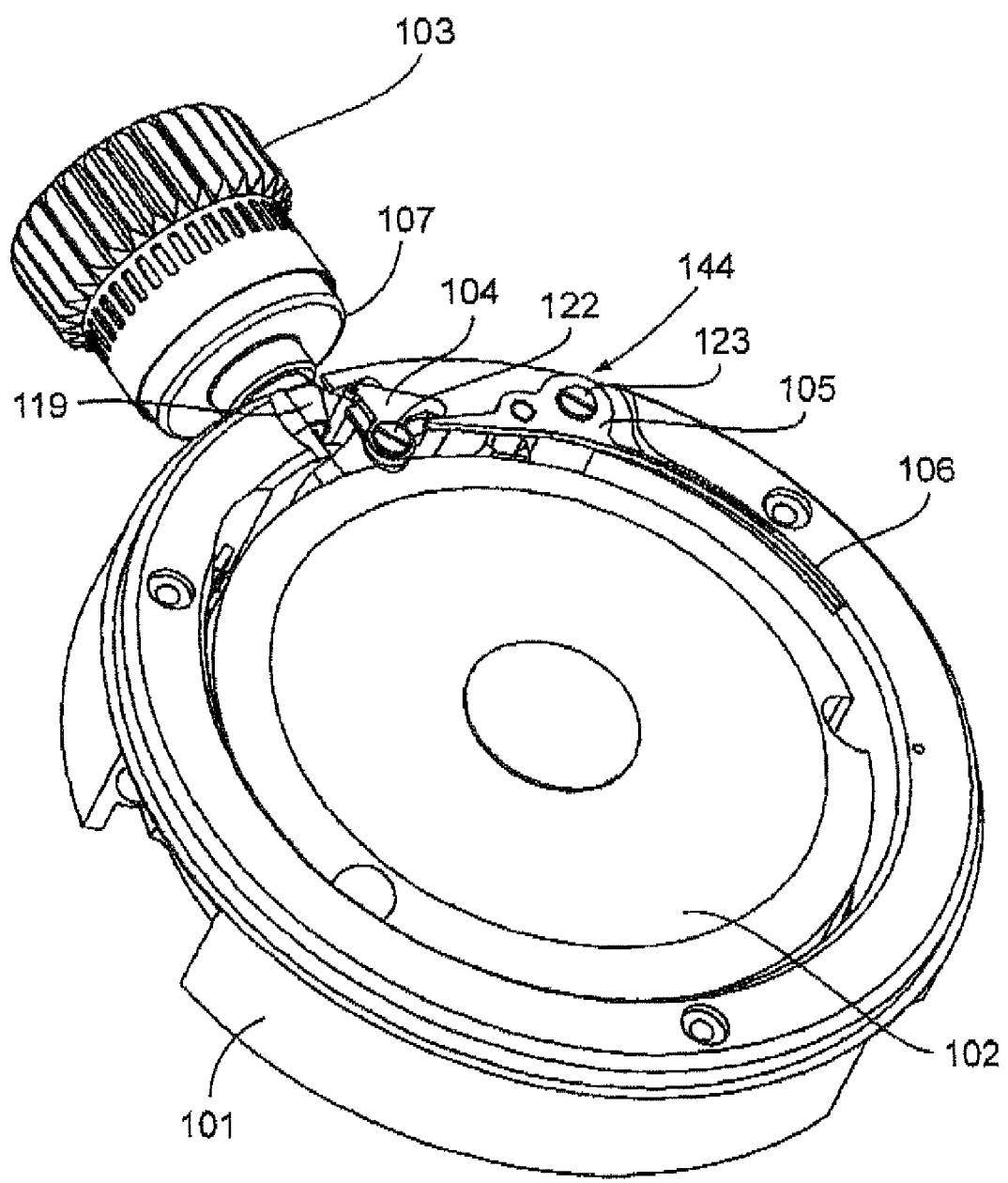

FIG. 12 shows the mechanical movement 102, crown 103, and its tube 107 set up around the casing ring 101. One can recognize there the transmission mechanism 144 with a first lever and its pivoting axis 122. This lever 104 actuates a second lever 105 pivoting about an axis 123. This lever is extended by a blade 106 acting as a return spring. It has a reduction ratio of 1:2. The two levers are mounted onto the casing ring 101.

Cam 119 that is mounted onto the piston rod cooperates inside of the casing ring 101 with the first lever 104.

Figure 13:
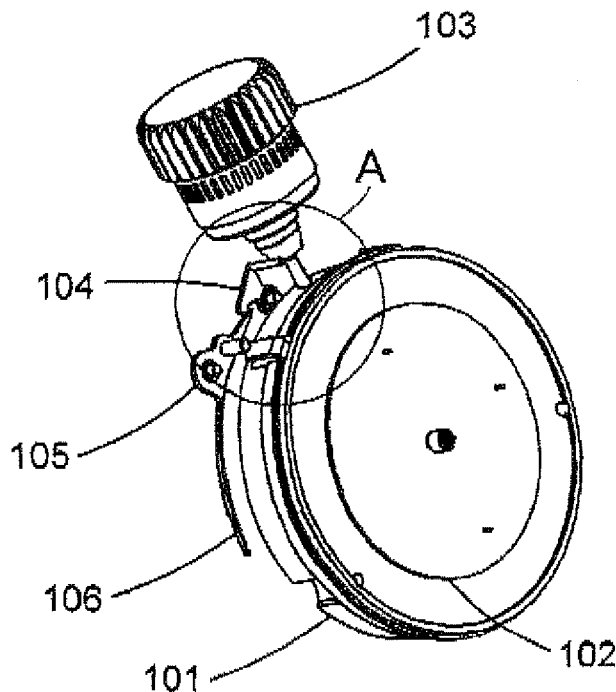

FIG. 13 shows the same set of parts as FIG. 12, but turned over by 180° in order to present the detailed view of A that is the subject of FIG. 14. Here one sees tube 107, and at its exit cam 119 in contact with a roller 120 mounted on an axis 121 that is integral with the first lever 104. This lever is rotated by the movement of cam 119, and itself rotates the second lever 105. With its pin 124, this second lever 105 pushes onto the control strip 125 of the chronograph. Winding stem 126 is fixed within the rod extension 108.

Figure 15:
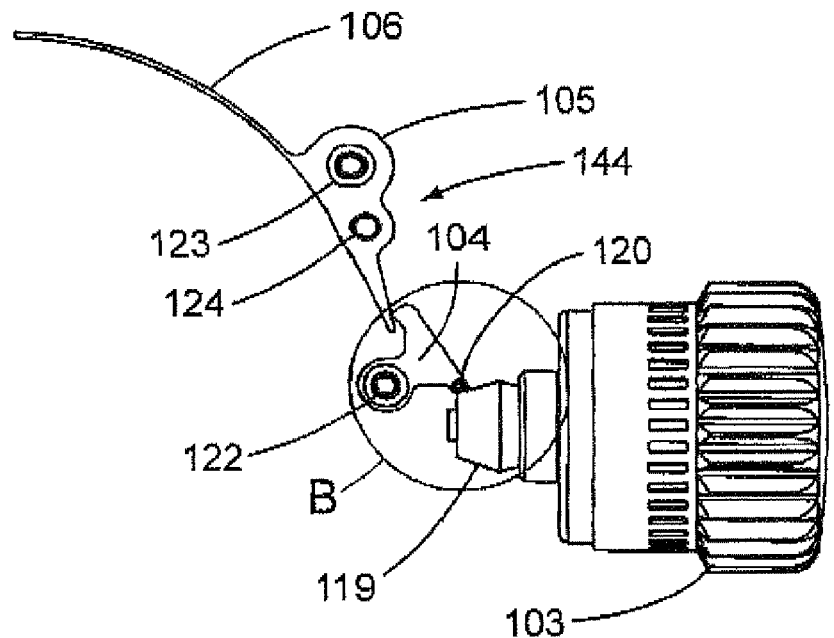

FIG. 15 shows the entire set of mobile segments, the crown 103, cam 119, first lever 114, second lever 115, return spring 106 and pin 124. The set is in the position of zero pressure, and roller 120 is solicited against cam 119 by return spring 106.

Figure 16:
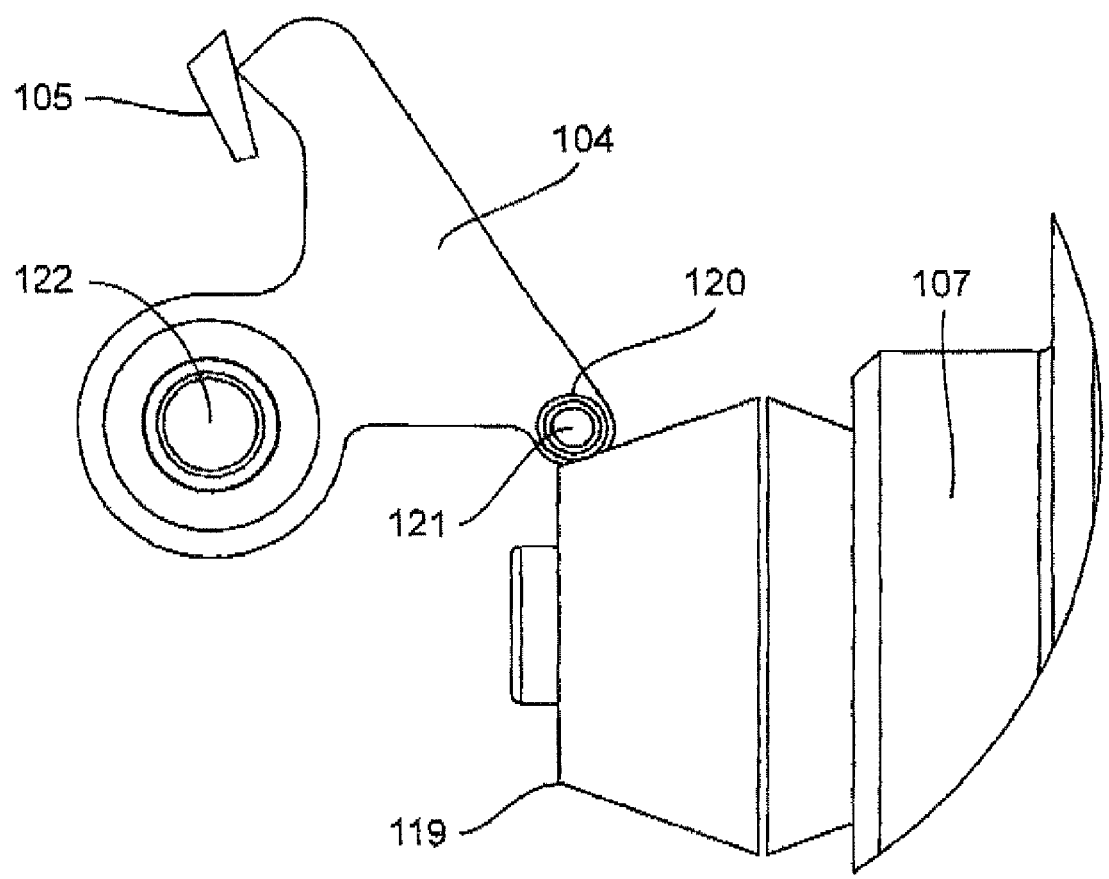

FIG. 16 shows detail B with all the elements that have been described above, viz., crown tube 107 and the cam 119 arranged at its exit, push lever 104 turning about the pivoting axis 122 and cooperating with cam 119 via its roller 120 mounted on axis 121, as well as the second lever 105 cooperating with the first lever 104.

The principle of functioning is as follows. The pressure arrives through openings 116 of crown 103 and crown tube 107, then stops in chamber 118. Piston 112 pushes piston rod 111 owing to the water tightness of O-rings 114 and 113. Piston 111 then compresses spring 110 that functions as restoring element, and disengages piston rod 111 from crown tube 107. Crown 103 and rod extension 108 that are solidly connected by the attachment 115 driven in allow the crown to transmit the functions to rod extension 108, and then to winding stem 126 of the movement, so as to realize the winding function in a first notch, and the time-resetting function in a second notch, etc. Thread 109 of the rod extension 108 corresponds to the thread of the movement's winding stem 126.

It can be noticed that the set of crown 103 and rod extension 108 is completely independent of the set formed by piston 112 and piston rod 111. The only fixed part is crown tube 107, that itself is fixed at the case. During pressure pickup in descent, the set of piston and piston rod moves together with the cam; for this reason, and because of the combination of the two levers, the first lever rises to the summit of the cam, then falls back to its initial position producing a first impulse onto the control strip of the movement via the second lever. During decompression while reascending, the first lever rises back to the summit of the cam, then falls back to its initial position producing a second impulse onto the strip via the second lever. An adequate reduction ratio is provided by the combination of the two levers.

In the functions of a diving watch, it may be necessary to sense the pressure in order to trigger either an action of the chronograph or any other function at a given depth.

The difficulty resides above all in the volume and area that must be available in order to secure certain movements triggering the chronograph. The value in newtons that is needed to actuate an associated push-piece is between 9 and 15 newtons for a displacement of 1 mm; the force obtained cannot be larger than 2 to 3 newtons if with a piston diameter of at most 8 mm such a value should be obtained at a depth of five meters.

According to this second embodiment, one uses such a piston having a diameter of less than 1 cm, and hence said 2 to 3 newtons of force, but the space available in the crown is used to obtain a displacement four to five times the displacement applied to the push-piece; thanks to an adequate lever arm, one thus can obtain a sufficiently strong force acting upon the sensor of the movement.

The pressure sensor therefore consists of a piston retained by a spring sitting in the winding crown. The entire arrangement is integrated into the crown in order to respect the original watch design.

Figure 17:
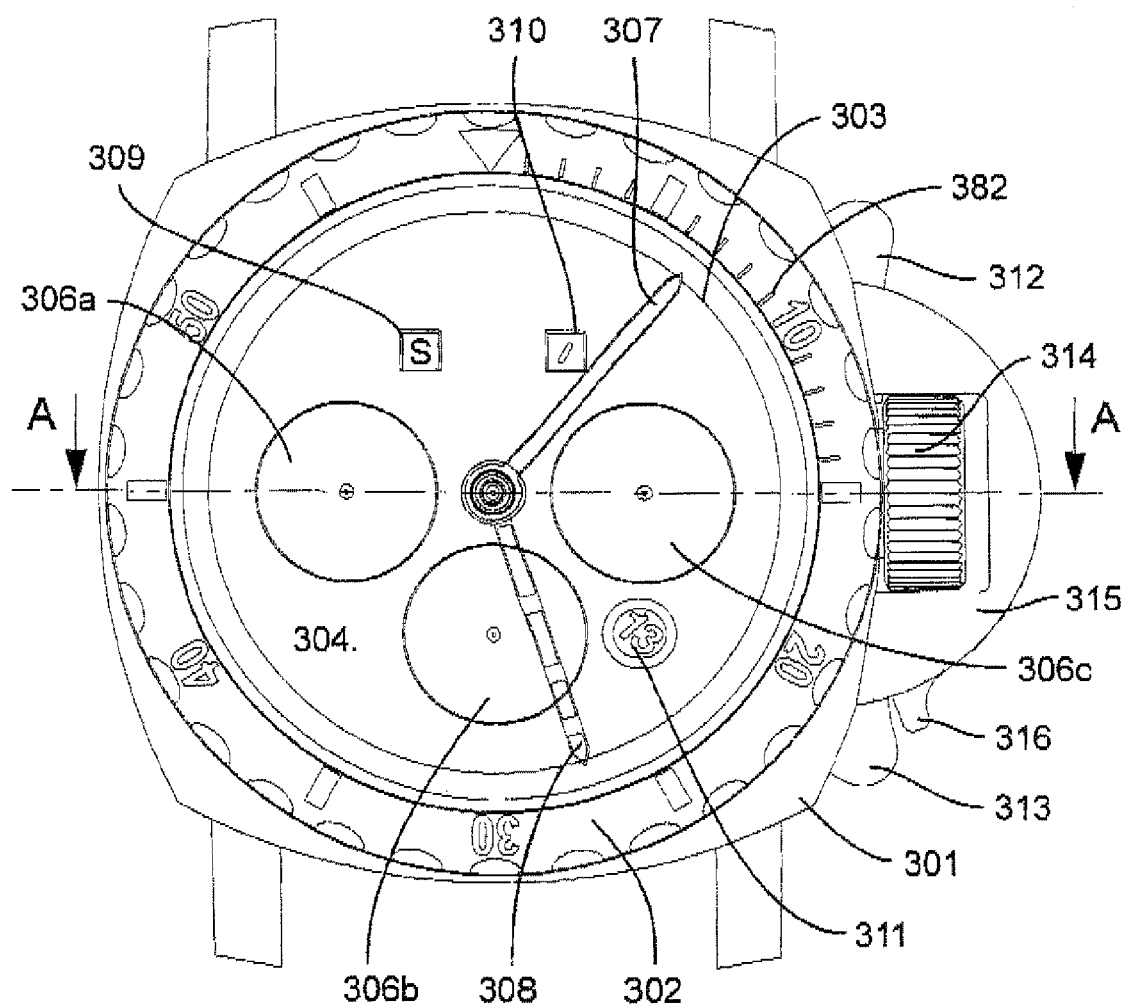

The third embodiment is illustrated in FIGS. 17 to 35. It refers to a diving chronograph watch such as illustrated in FIG. 17 with watchcase 301, bezel 302 with glass 303 and dial 304 having a counter 306a of thirty minutes at 9 o'clock, a counter 306b of 12 hours at 6 o'clock, and a counter 306c of permanent seconds at 3 o'clock. The watch in addition comprises the usual central hands for the hours, minutes, and counter of seconds that are not illustrated, a depth hand 307, and a maximum-depth hand 308 that indicates the maximum diving depth, at 11 o'clock a first window 309 for display of a danger or safety flag S, at 1 o'clock a second window 310 for display of a dive flag, and a 5 o'clock a third window 311 for display of the date. In addition, at 2 o'clock the watch is provided with a first push-piece 312 allowing the chronograph to be manually triggered and stopped, at 4 o'clock a second push-piece 313 for zero resetting of the chronograph, and at 3 o'clock a crown 314.

The latter is surrounded by a bridge 315 holding an articulated release lever 316 such as that described, for example, in the European patent application No. EP 1,010,043 A.

Figure 18:
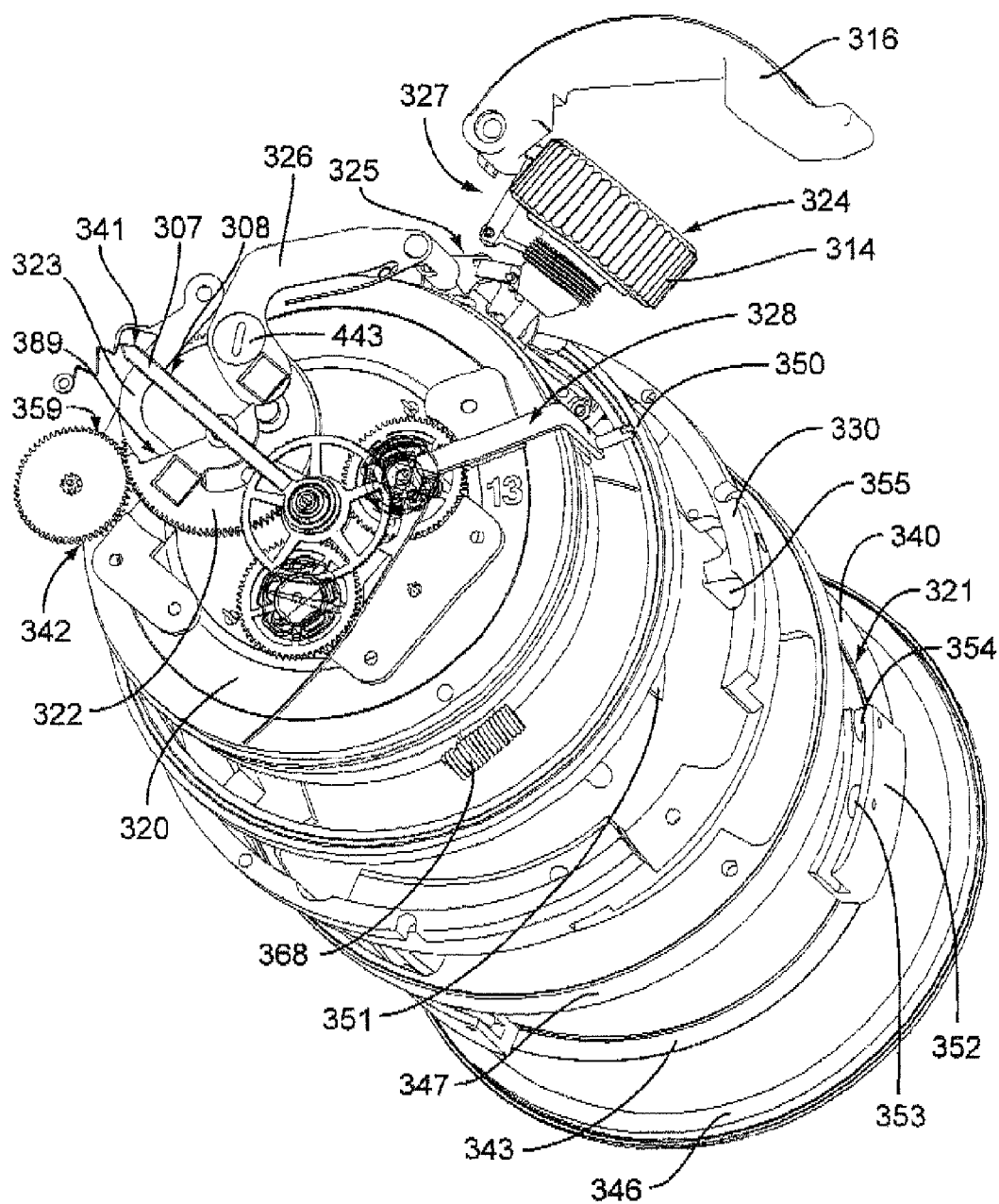
Figure 19:
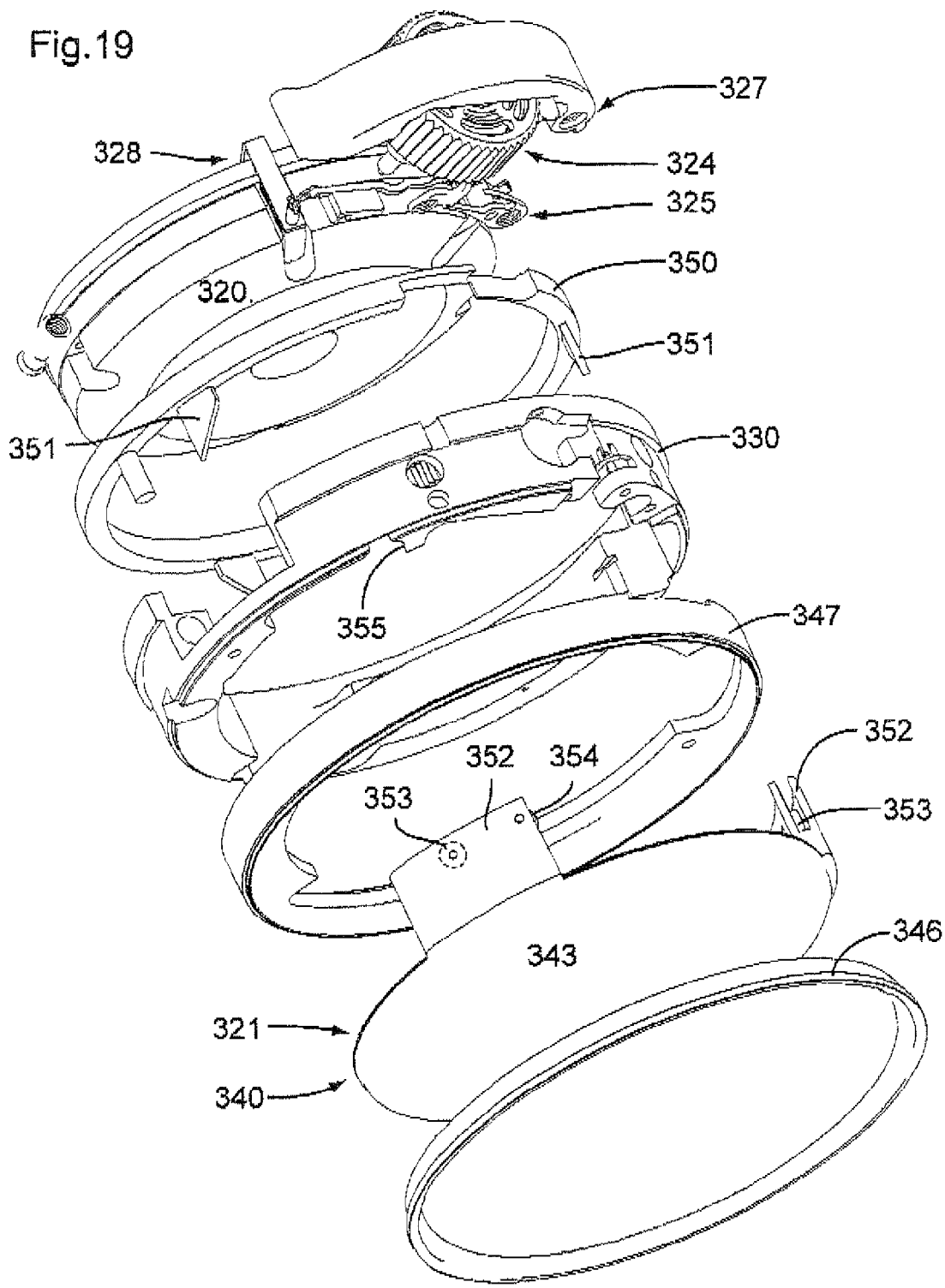
Figure 20:
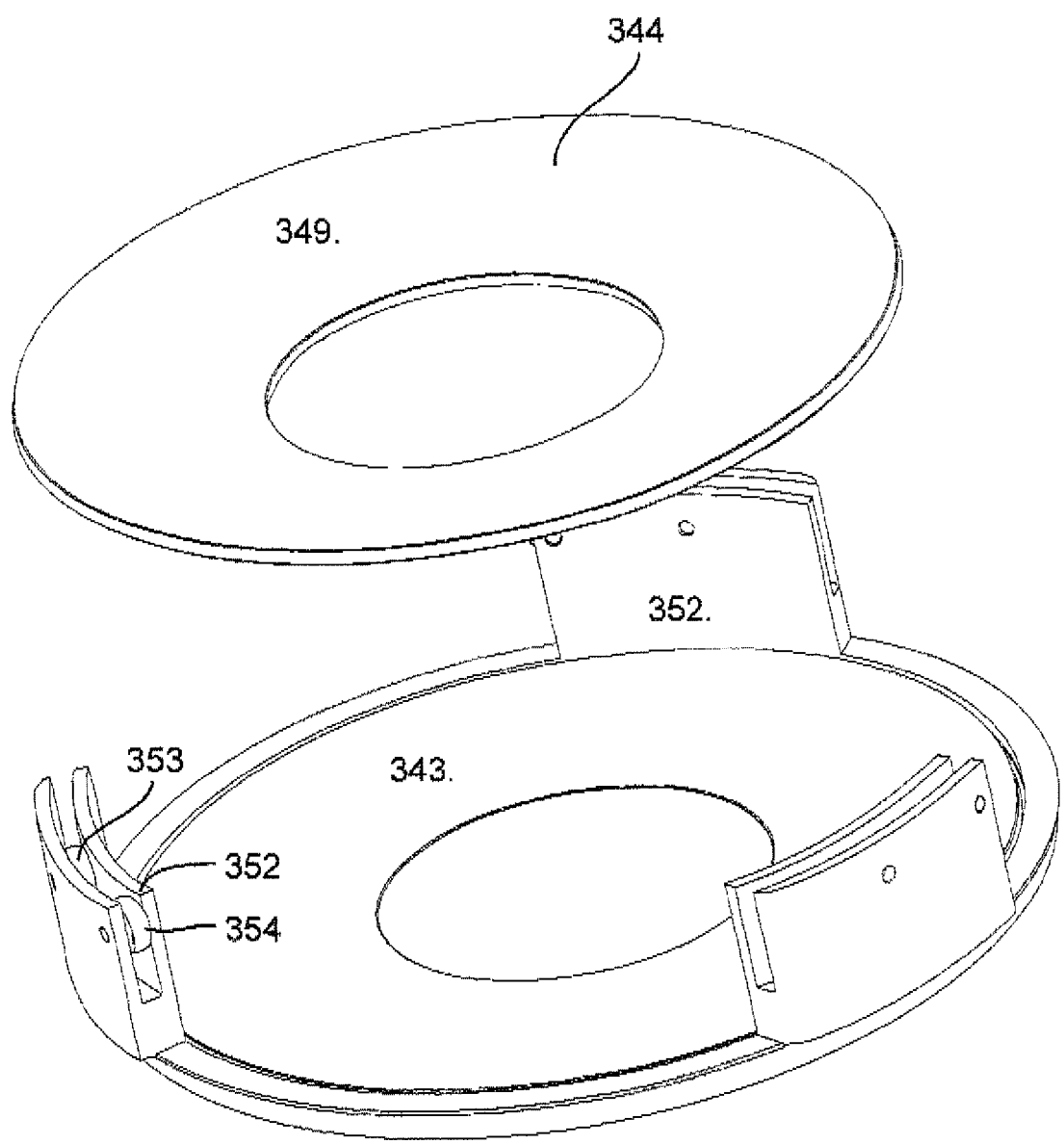
Figure 21:
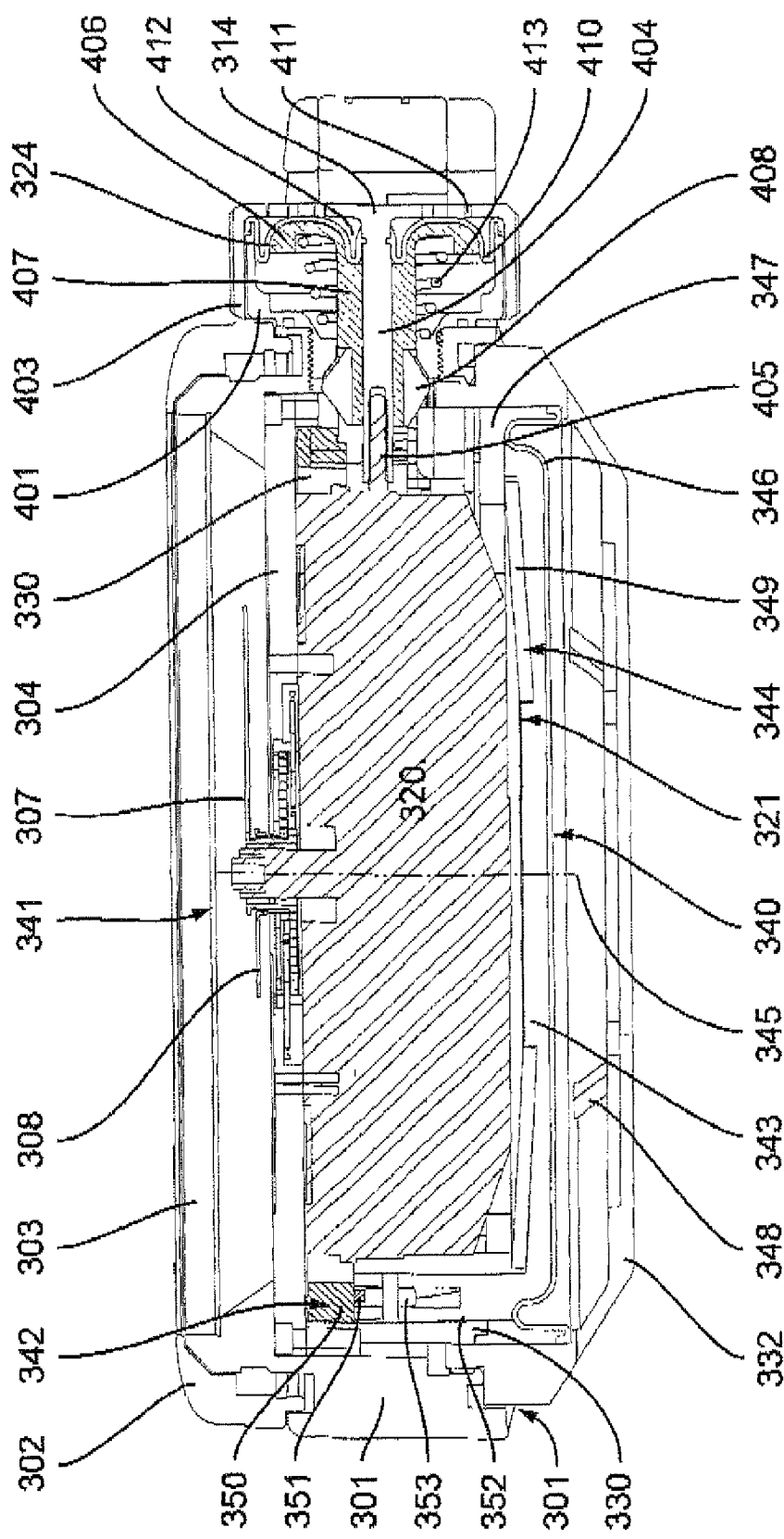

Referring to FIG. 18, this third embodiment comprises the following major modules:

a movement 320, preferably mechanical for measuring and displaying the time;

a depth measuring device 321 with which the value of diving depth can be permanently measured and displayed;

a maximum indicator device 322 for the maximum depth attained during a dive, a first display device 323 for a safety flag S 389;

a pressure sensing device 324 associated with a control device 325 for the automatic start and stop of the chronograph, with a second display device 326 for the dive flag 443, and with a locking device 327 for the chronograph's control device 325, a zero-resetting device 328 for the maximum indicator device 322, the chronograph's control device 325, and the second display device 326.

Referring to FIGS. 18 to 21, movement 320 is surrounded by a casing ring 330 on which dial 304 is fixed with screws. The casing ring 330 is mounted into case 301 that is provided with a back 332 and with a bezel 302 connected with glass 303.

The depth measuring device 321 comprises a sensor mechanism 340 for measuring the depth or external hydrostatic pressure, indicator organs 341 for the value or values measured, and transmission elements 342 linking the sensor mechanism 340 to the indicator organs 341.

In this embodiment, the sensor mechanism 340 mainly consists of a piston 343 that can be displaced by the hydrostatic pressure against the action of a restoring element 344 in an axial direction 345 perpendicular to the principal plane of the watch. This piston is housed between the back 332 and the movement 320. In the direction of the back it is in contact with a rolling sleeve diaphragm 346 fixed on an intermediate ring 347 and acting as a gasket arranged between piston 343 and back 332. The water penetrates through openings 348 provided in the back, to push piston 343 via the rolling sleeve diaphragm 346. The axial displacement is a function of hydrostatic pressure, and corresponds to 2 mm for a diving depth of 60 meters.

The restoring element 344 here consists of a conical or Belleville washer 349 that with its outer rim rests on the casing ring 330 via intermediate ring 347, and with its inner rim rests on piston 343. The Belleville washer 349 has the advantages of small space requirements, elevated resilience, and a linear response between the pressure and its motion or deformation corresponding to the displacement of piston 343. Its truncated cone shape is readily seen in FIG. 20.

The transmission elements 342 comprise a circular slide 350 slidingly housed in the casing ring 330. This slide is provided with three ramps 351 (FIG. 19) constituting cams.

The piston 343 (FIG. 20) comprises three extensions 352 each having two rollers 353 and 354. A first roller 353 functioning as cam follower is intended to cooperate with one of the ramps 351 with which it is associated. The second roller 354 rests on a landing 355 (FIG. 19) of the casing ring 330 in order to inhibit all rotation of piston 343. Thus, the axial displacement of the piston produces a corresponding rotation of slide 350, the ratio between axial displacement and rotation being a function of the slopes of ramps 351 that can be defined according to the application. The profile and angle of the ramp slopes are thus readily modified so as to adapt them to the desired displacement of the depth hand 307.

Figure 22:
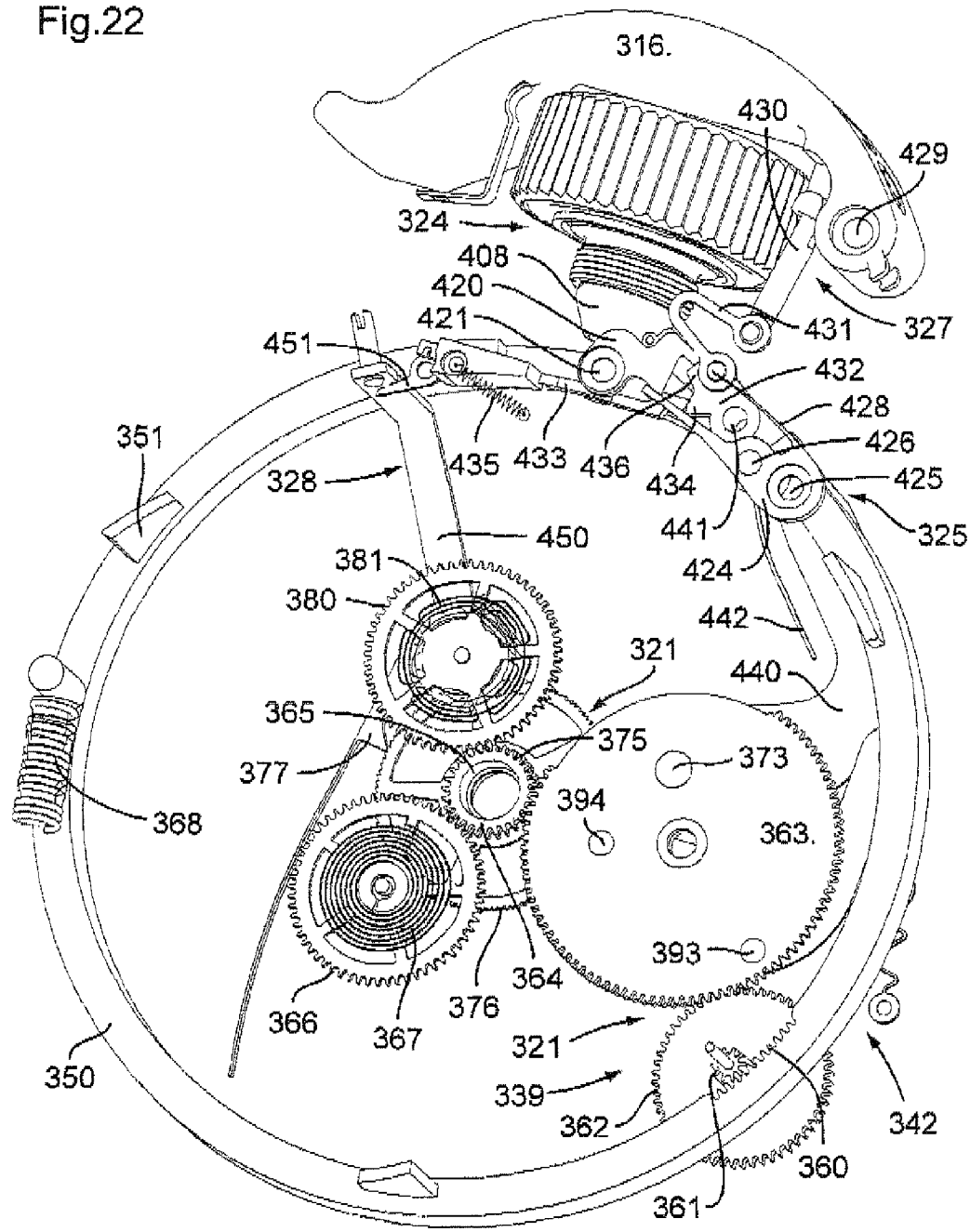

The transmission elements 342 are distinctly visible in FIG. 22, and comprise the slide 350 fitted with a rack 360 cooperating with a gear train 359 comprising a pinion 361 integral with a small wheel 362 that is engaged with an intermediate wheel 362 driving via a first barrel 365 a central pinion 364 integral with the depth hand 307. Slide 350 is solicited toward a rest position by a return spring 368.

The central pinion 364 additionally is engaged with a return wheel 366 solicited toward a rest position by a spiral spring 367. This wheel 366 secures a precise contact of the different gears of the transmission elements 342, and eliminates all play within the kinematic chain.

Figure 28:
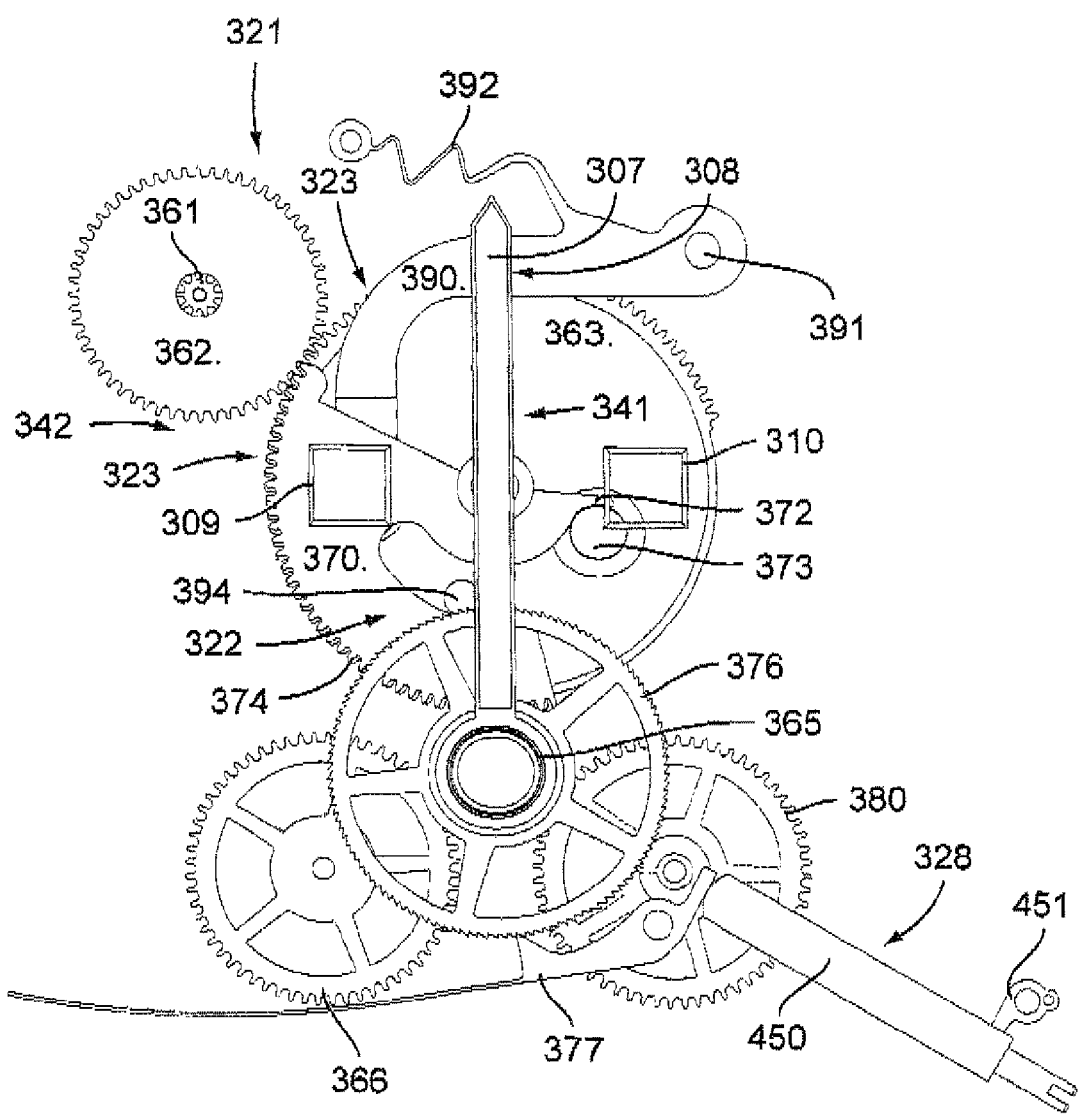
FIGS. 28 to 33 are top views of another segment of the third embodiment in the initial or rest position (FIG. 28), at the start of descent (FIG. 29), at the end of descent (FIG. 30), at the end of reascent to −5 meters (FIG. 31), at the end of reascent to −4 meters (FIG. 32), and at the end of the dive after zero resetting.
Figure 29:
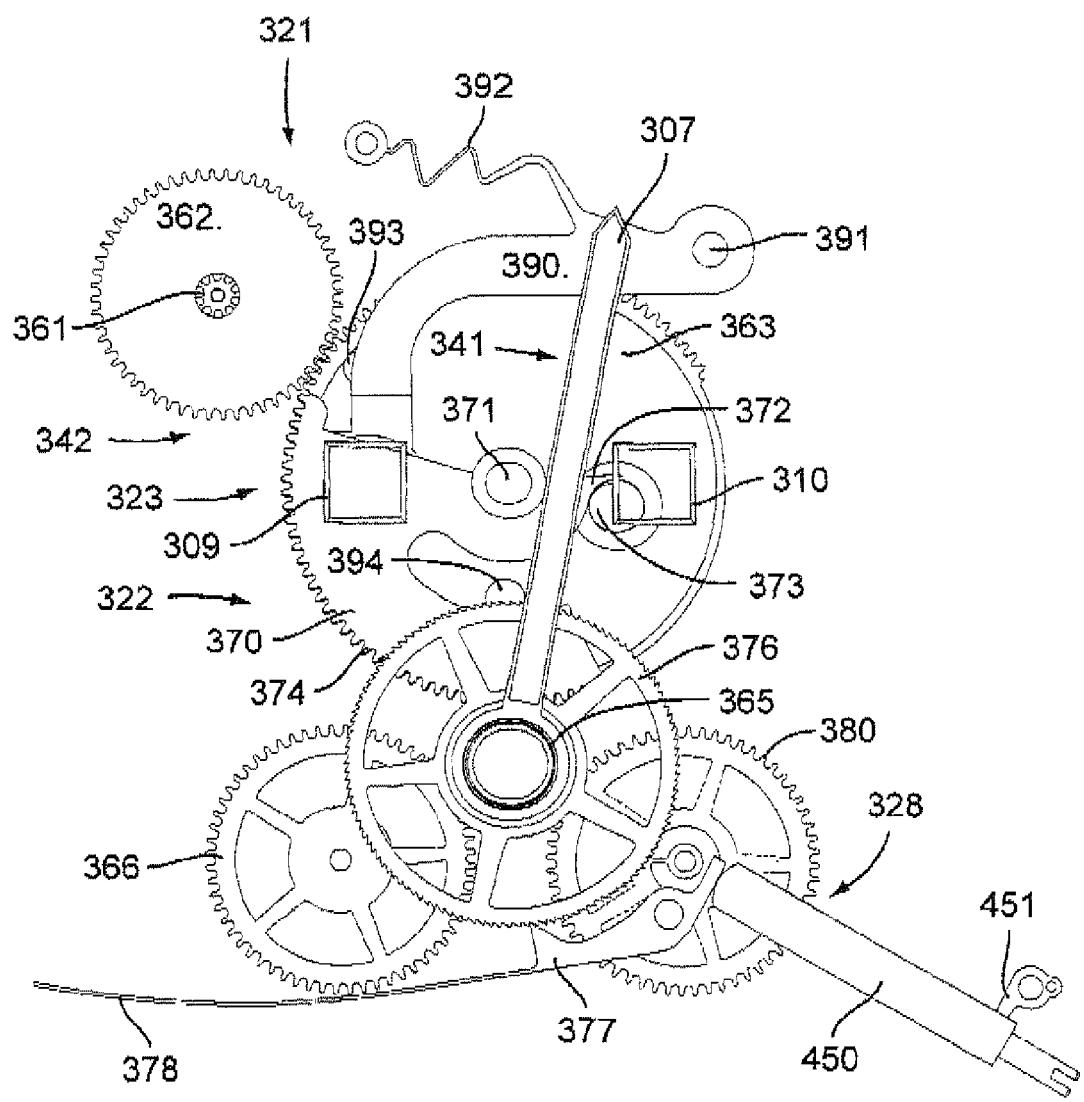

The maximum indicator device 322 is clearly visible in FIG. 28. It comprises a toothed sector 370 mounted idle on shaft 371 of the intermediate wheel. This toothed sector 370 has an extension 372 arranged so that it will cooperate with a driving pin 373 that is integral with the intermediate wheel 363, in order to be rotated when the intermediate wheel rotates anticlockwise as seen in FIG. 29, that is, when the external pressure increases. This toothed sector 370 is released from intermediate wheel 363 when the external pressure decreases.

Teeth 374 of the toothed sector engage with a second central pinion 375 (FIG. 22) that is coaxial with the central pinion 364, and integral with the maximum-depth hand 308 as well as with a wheel with pawl 376. The latter cooperates with a pawl 377 constituting a unidirectional locking organ that can be released, and is intended to lock the second central pinion 375 and the maximum-depth hand 308 during every advance of the intermediate wheel 363. Pawl 377 is extended by a spring blade 378 securing perfect contact with the tooth bottom.

During decrease of the pressure, the intermediate wheel 363 turns clockwise as seen in FIG. 29. The toothed sector 370 will then not be driven but will remain locked to the maximum diving depth attained.

The second central pinion 375 (FIG. 22) is also engaged with a return wheel 380 solicited by a return spring 381 toward a rest position.

This return wheel 380 secures a precise contact of the elements of the maximum indicator device 322 as well as the zero return of the maximum-depth hand 308 during zero resetting.

The indicator organs 341 thus consist of the depth hand 307 and the maximum depth hand 308 indicating the maximum depth attained. The hands cooperate with a scale 382 attached to bezel 302 or dial 304 (FIG. 17).

Figure 30:
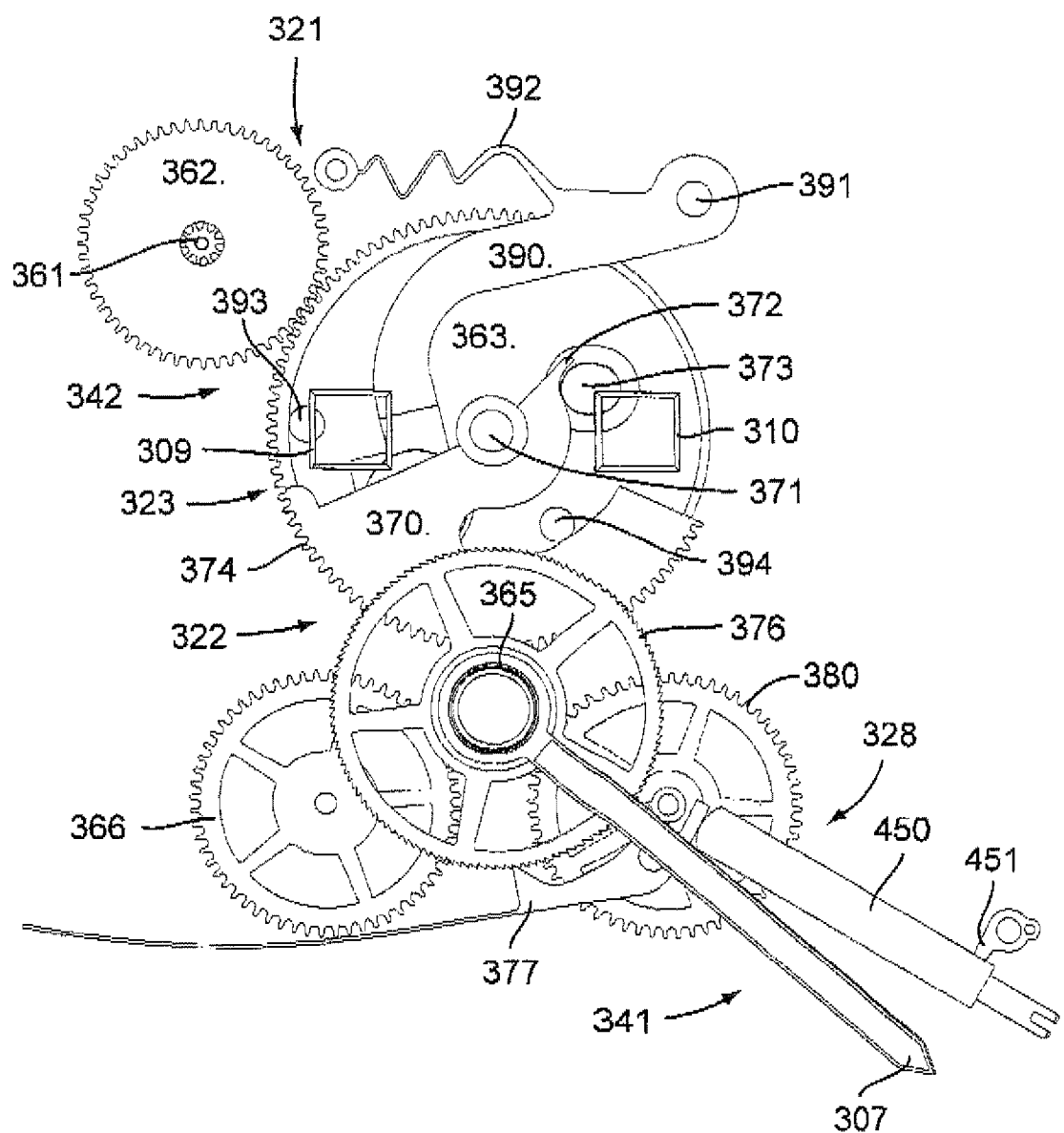
Figure 31:
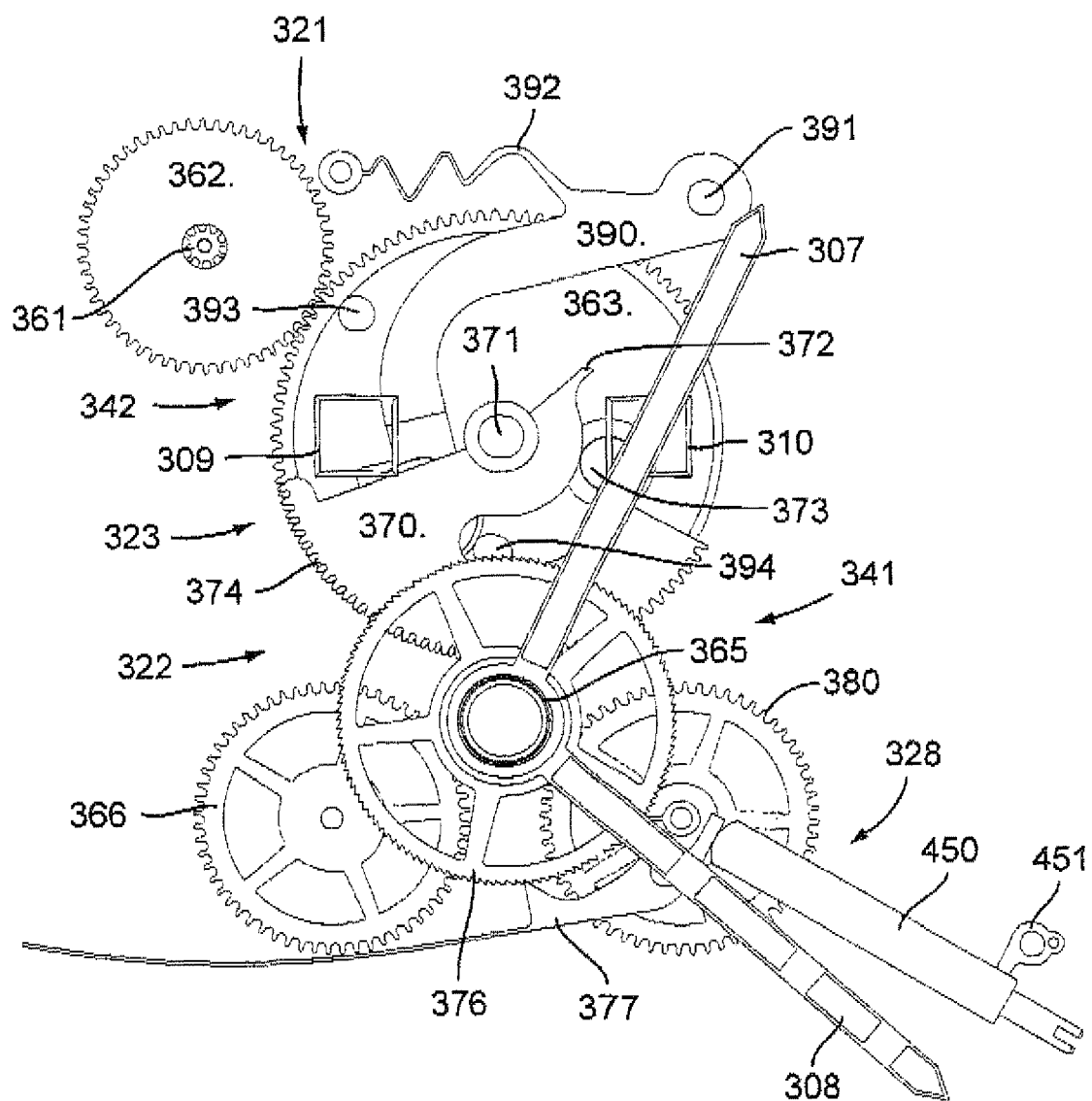
Figure 32:
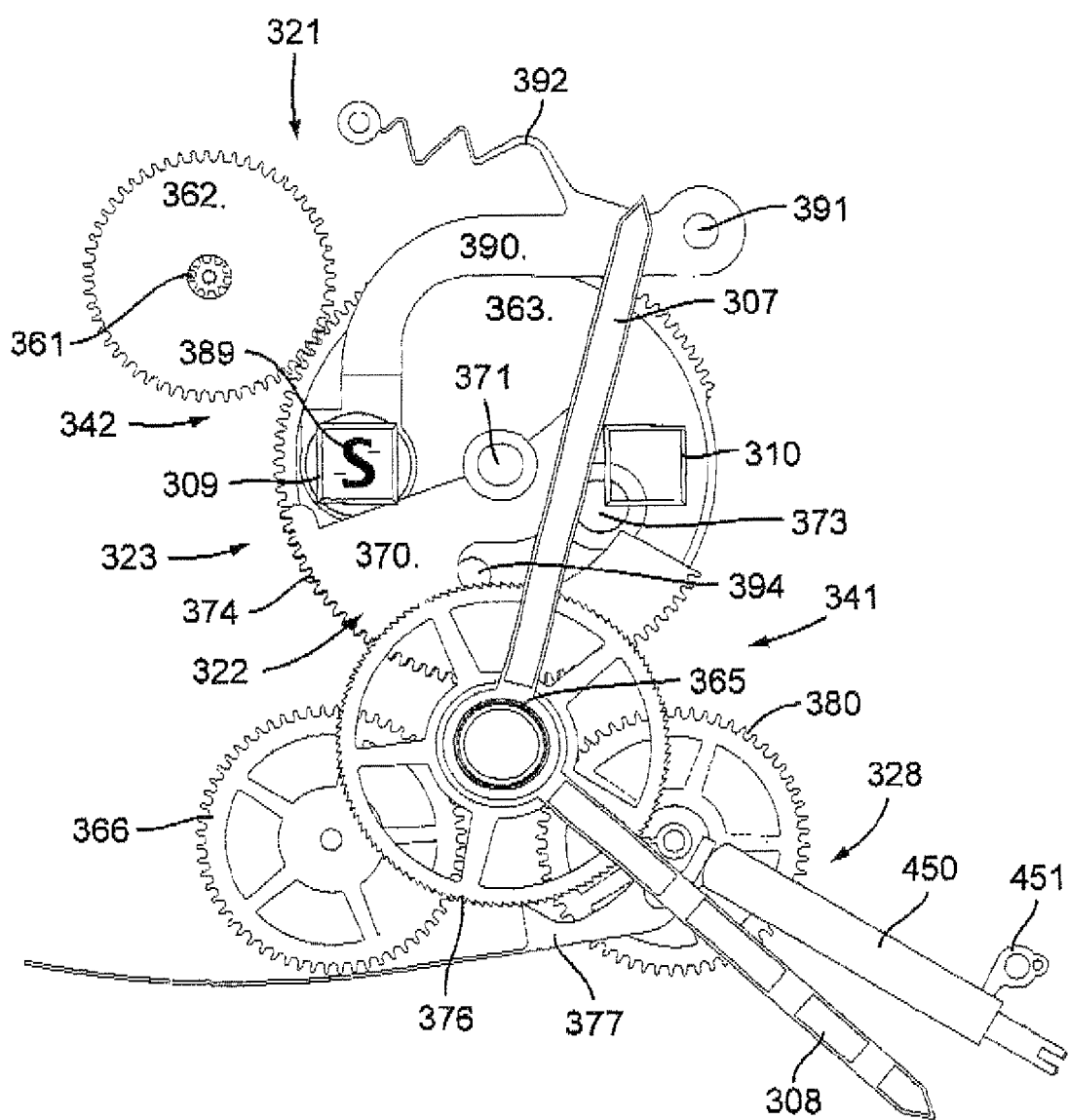

Referring to FIGS. 28 to 33, the first display device 323 for the safety flag S that is able to appear in window 309 comprises a bent arm 390 pivoted and articulated on a pivot 391, and holding at its free end the safety flag S 389 (FIG. 32). This arm is integral with a spring 392 securing a bistable function of the arm with two rest positions, that is, one active position of flag display (FIGS. 28, 29, 32, 33) and one retracted flag position (FIGS. 30, 31). The change in position of this arm between these two rest positions is produced by two pins 393, 394 (FIG. 30) integral with the intermediate wheel 363.

Figure 33:
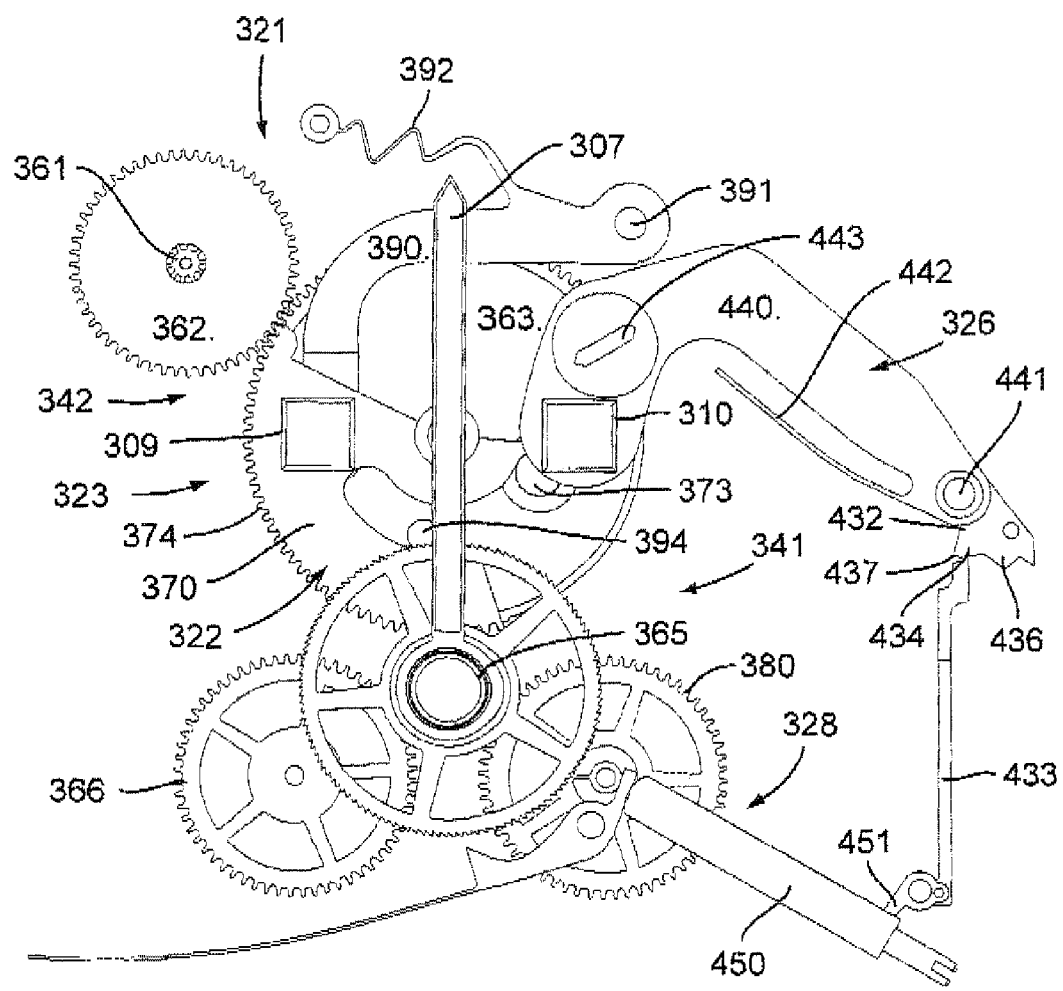

During the diving descent, pin 393 delivers a downward impulse as seen in FIG. 29, whereupon the bent arm 390 freely swings toward the retracted position (FIG. 30). Likewise during the ascent, pin 394 causes the bent arm 390 to swing toward the active position (FIG. 32) in which flag S 389 is seen in window 309. It should be noticed that toothed sector 370 is between flag S 389 and window 309 at the start of diving descent as well as after zero resetting (FIGS. 28, 29, 33). Flag S will then not be visible in window 309 even though it is in the active position.

Figure 34:
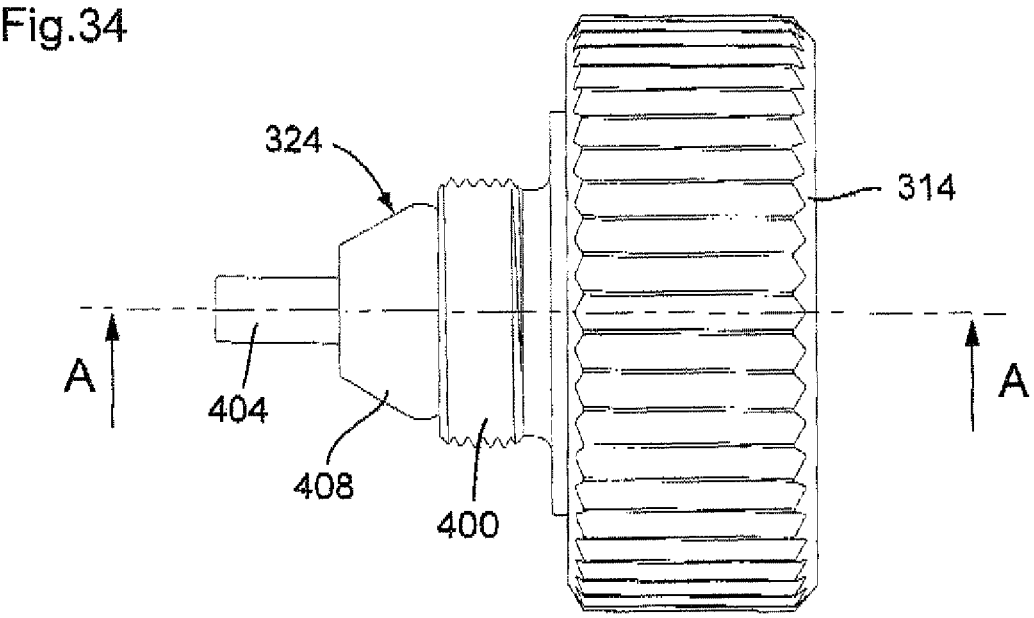
FIG. 34 is a lateral view of the sensing device integrated into the crown.
Figure 35:
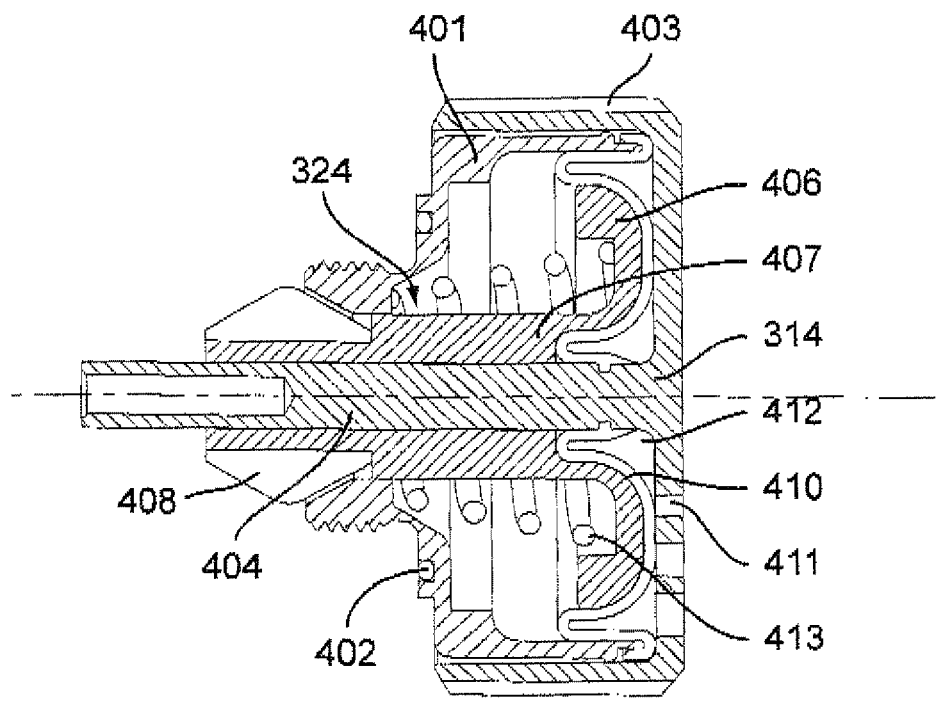
FIG. 35 is a view in axial section along the plane A-A of FIG. 34.

The pressure sensing device 324 is illustrated in particular in FIGS. 34 and 35, and is integrated into the crown 314 of the watch. The crown is mounted axially sliding on a crown tube 401 that is screwed onto case 331 of the watch. An O-ring 402 secures water tightness. The cylindrical wall 403 of crown 324 is arranged so as to face the outside of crown tube 401 in order to guide the crown in its axial displacement.

Crown 314 is integral with a rod extension 404 that is intended to be screwed to a winding stem 405 (FIG. 21) of movement 320, in order to provide the functions of rotation and translation of the winding stem.

A piston 406 that is integral with a piston rod 407 is mounted into the inside of crown 314 and crown tube 401. The piston rod 407 is slidingly fitted to the rod extension 404, and at its free end holds a cam 408 with two ramps in the shape of a double cone advantageously constituted by a cut stone. Water tightness of sensor device 324 is secured by a rolling sleeve diaphragm 410 fastened with its outer edge to the crown tube 401, and with its inner edge to the rod extension 404. This diaphragm 410 is housed between crown 314 and piston 406 while adhering to the outer shape of the piston.

The water penetrates through openings 411 provided in the crown, into a chamber 412 located between the rolling sleeve diaphragm 410 and crown 314, in order to displace piston 406 against the action of a retaining element consisting of a spring 413 resting on crown tube 401 and the inside of piston 406, along the axis of the crown. By realizing water tightness with the rolling sleeve diaphragm, one achieves a construction that is shorter, reliable, and requires very little space.

The frictions are minimal, and thus the precision is higher.

Figure 24:
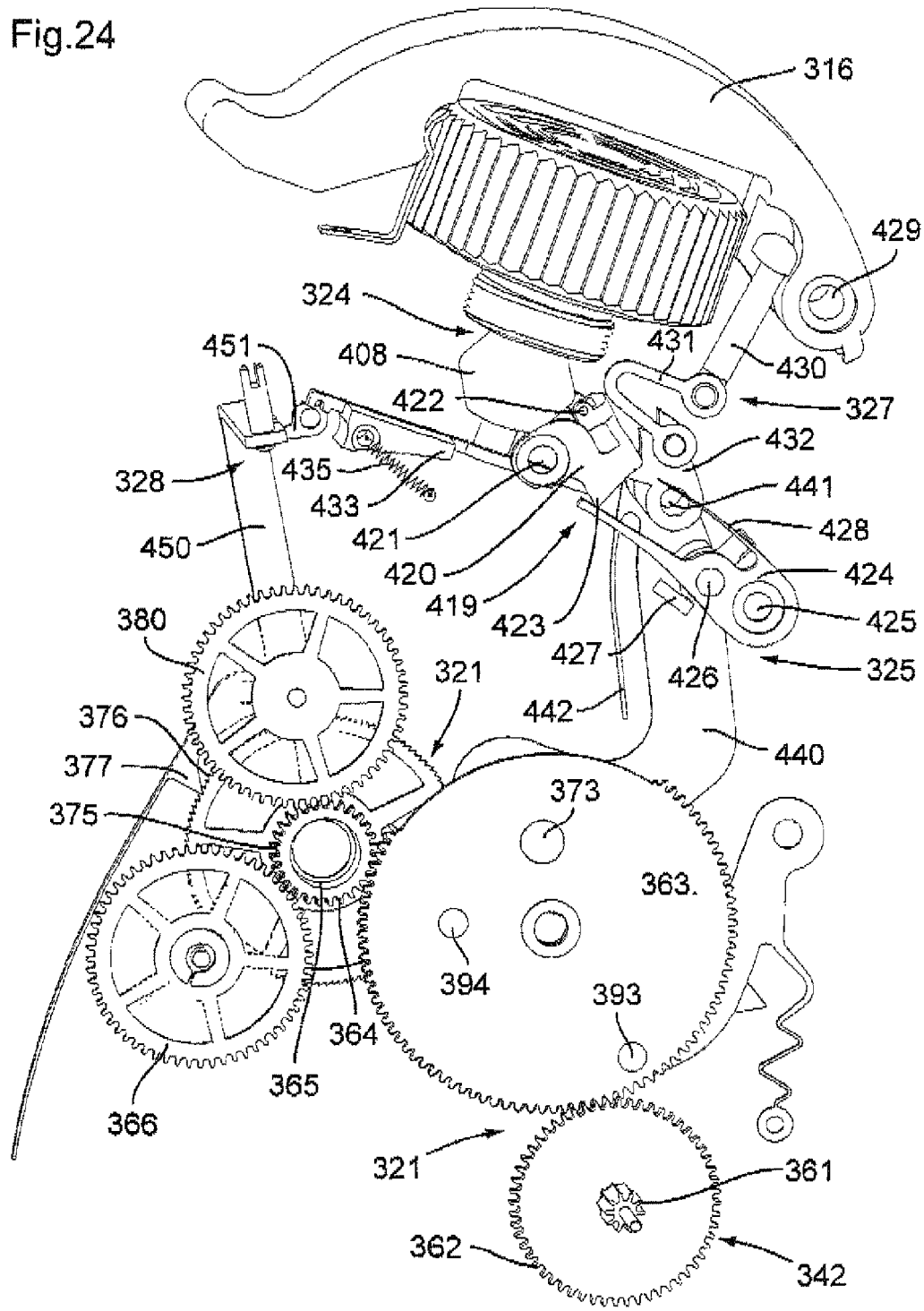
Figure 25:
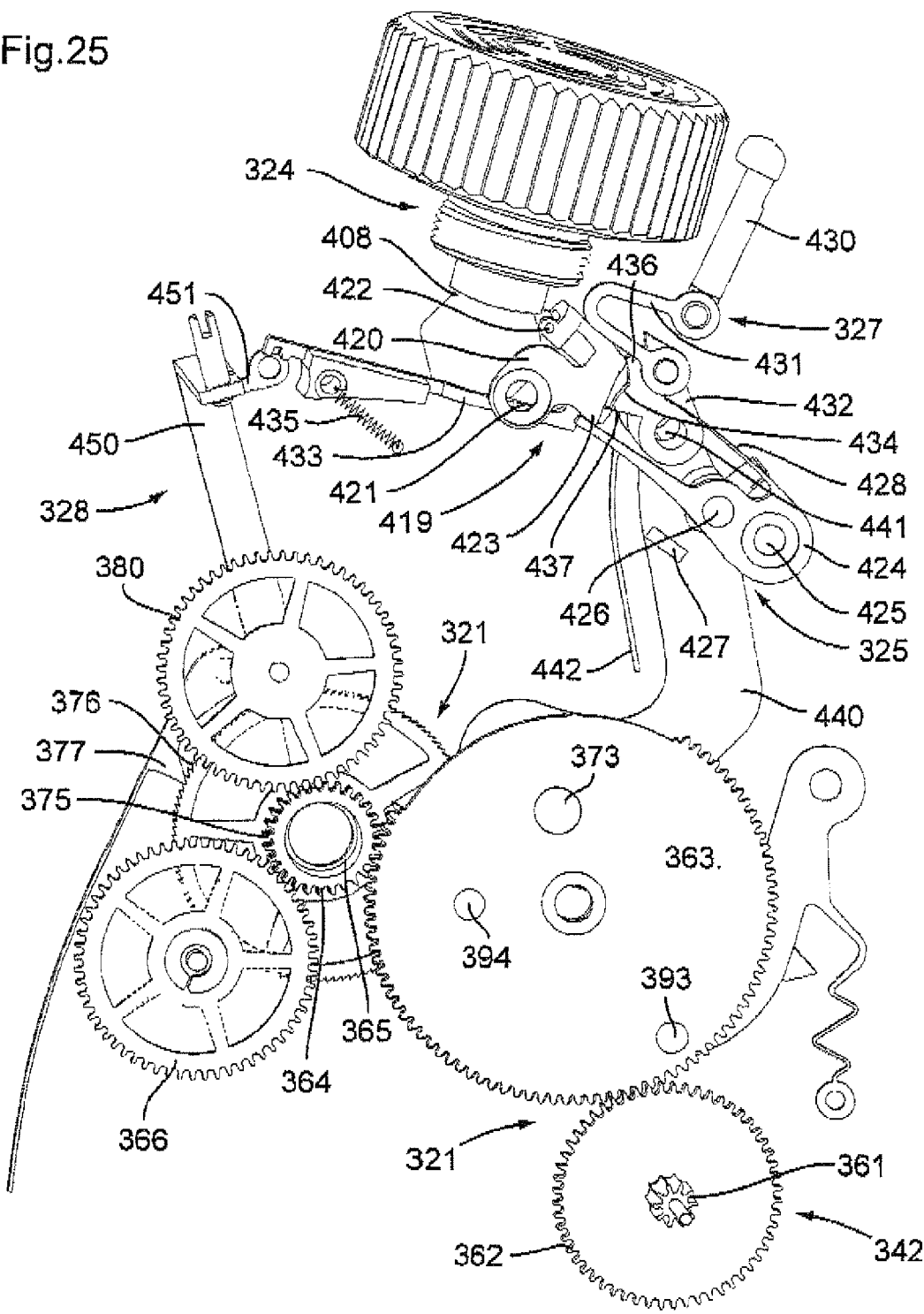

This sensor device 324 cooperates with control device 325 for the automatic start and stop of the chronograph. It could of course be linked to other devices of the watch. Referring to FIGS. 24 and 25, the chronograph's control device 325 includes a transmission mechanism 419 with a first lever 420 pivoting about an axis 421, and having a roller 422 intended to cooperate with cam 408. A beak 423 of this first lever 420 cooperates with a second lever 424 mounted so as to pivot about an axis 425. A pin 426 of this lever is intended to cooperate with a control strip 427 of the chronograph so that the chronograph is started by a first impulse when cam 408 comes out during diving descent at increasing external pressure, and stopped by a second impulse when cam 408 retreats during ascent at decreasing external pressure.

A spring blade 428 integral with the second lever 424 serves as an elastic restoring element for levers 420 and 424.

FIG. 24 shows the position of the parts of control device 425 during an impulse that corresponds to a predetermined pressure and depth, for instance 5 meters. In the position of FIG. 25 the chronograph is running, and the depth exceeds the predetermined depth.

The sensor device 325 is associated in addition with the locking device 327 intended to lock and unlock the transmission mechanism 419, and comprising the release lever 316 pivoting about an axis 429 (FIGS. 22 to 24) and intended to be actuated by a user via a to-and-fro movement. This lever acts upon a rod with shoulder 430 which via a V-shaped spring 431 catches a locking lever 432 pivoting about an axis 441. The link by means of spring 431 allows force and height differences to be compensated.

In a first position (FIG. 22), a zero resetting rod 433 rests on a shoulder 434 of this locking lever 432 under the action of a return spring 435. By means of a second shoulder 436 the locking lever 432 in addition maintains the first lever 420 in a rest position in order to lock the transmission mechanism 419.

Figure 23:
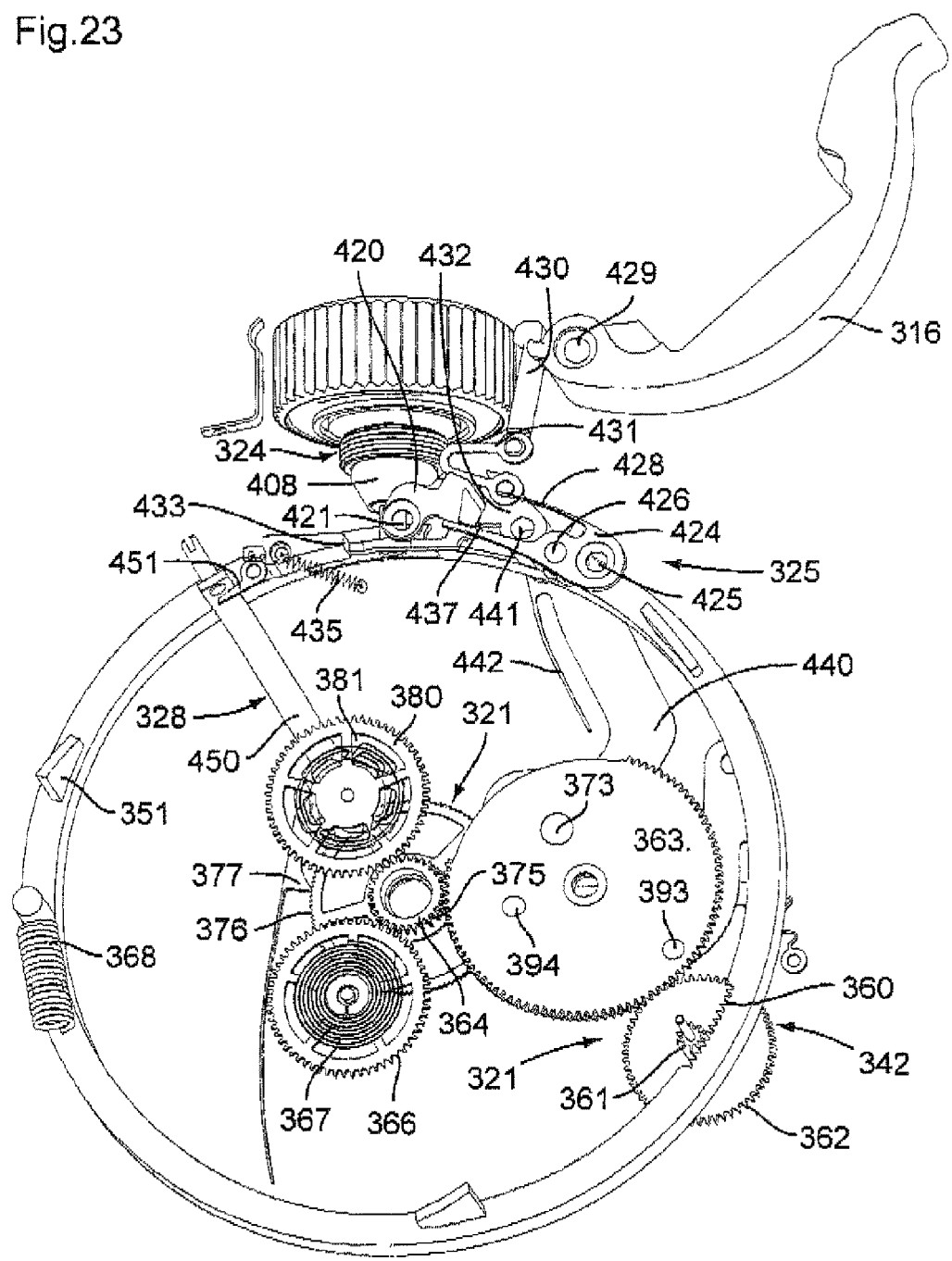

When the rod with shoulder 430 is pulled upward as seen in FIG. 23 or 25, it turns the locking lever 432 clockwise toward a second position in order to release the first lever 420 as well as the transmission mechanism 41*a*. The resetting rod 433 then passes beneath the tip 437 of the looking lever 432, which thus is held back in this active position in which the first and second levers 420, 424 are able to produce start and stop of the chronograph under the control of the sensor device 324.

Figure 26:
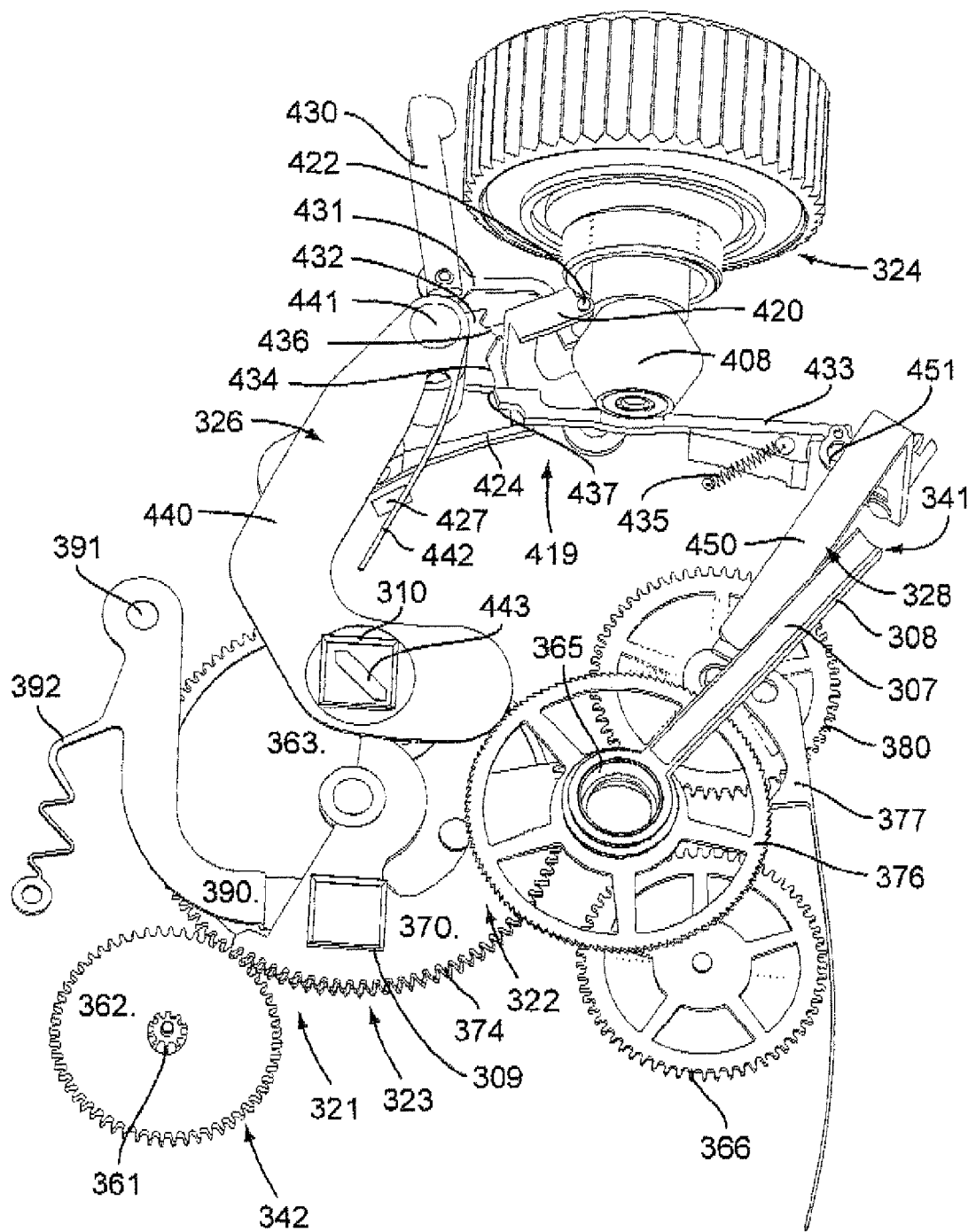
Figure 27:
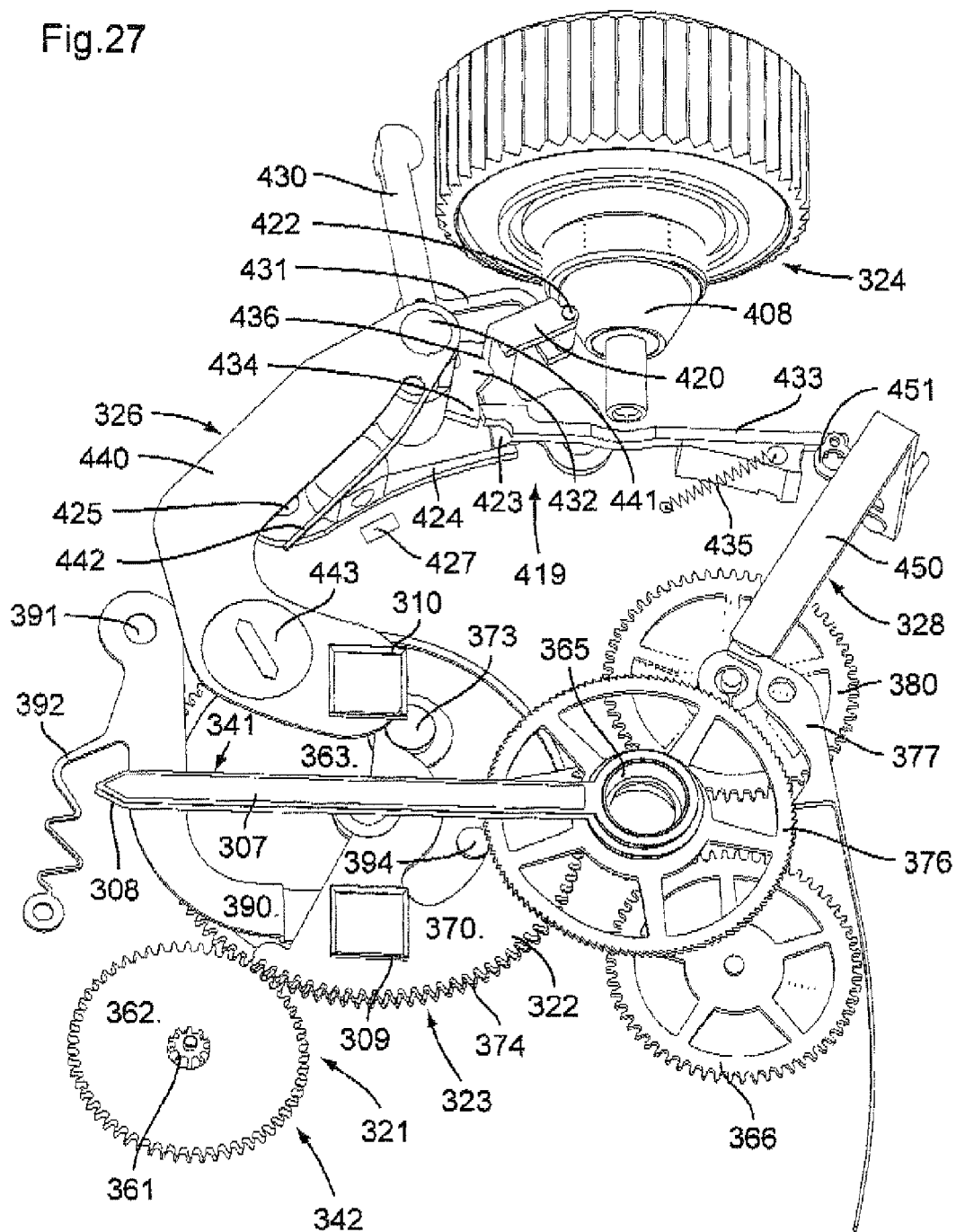

Referring to FIGS. 26 and 27, the second display device 326 for the diving flag 310 comprises a second bent arm 440 that is integral with the locking lever 432, and thus is pivoted about axis 441. The diving flag 443 is attached to the terminal segment of the second bent arm 440 in order to appear in window 310 in the active position. A return spring 442 secures the return of the second bent arm 440 toward the retracted position of flag 310 (FIG. 27).

The second bent arm 440 is retained in its active position by the locking lever 432 that cooperates with the zero-resetting rod 433, more particularly with its tip 437 as previously described.

The zero-resetting device 328 is intended to reset the diving chronograph to zero, more particularly to reset to zero the maximum indicator device 322, the control device 325 of the chronograph, and the second display device 326.

Referring to FIG. 27, this zero-resetting device comprises a push rod 450 cooperating via one of its ends with the zero-resetting push-piece 313 (FIG. 17), to reset the chronograph mechanism to zero, and cooperating with its other end with pawl 377. When push-piece 313 is pressed, the push rod 450 releases the tip of pawl 376 from the teeth of the wheel with pawl 377. Under the action of the return wheel 380 and its spring 381, the wheel with pawl 376 and the maximum-depth hand 308 produce their zero resetting.

The push rod 450 also cooperates with a lever 451 articulated at the zero-resetting rod 433, to displace the latter against the action of its return spring 435. The free end of the zero-resetting rod 433 then is released from the tip 437 of the locking lever 432 (FIG. 26) that pivots towards its rest position under the action of the return spring 442. In this position the first lever 420 and the entire transmission mechanism 419 are locked by the locking lever 432 (FIG. 27), and an automatic starting of the chronograph is made impossible.

Thanks to the rotation of looking lever 432, the second bent arm 440 is pivoted as well so as to turn diving flag 443 away from window 310.

During zero resetting of the maximum-depth hand 308, the toothed sector 370 turns clockwise as seen in FIG. 33, in order to come back to its initial or rest position in which it hides flag S from being seen in window 309 (FIGS. 27 and 33).

The functioning of the diving chronograph watch is as follows.

The various elements of the watch are illustrated in their rest positions in FIGS. 22 and 28.

Prior to the dive, the unlocking device 327 is actuated by pivoting the release lever 316 to-and-fro (FIG. 23). The first lever 420 is then released and in contact with earn 408, ready for the automatic triggering of the chronograph.

The locking lever 432 and the second bent arm 440 are pivoted, and the diving flag 443 appears in window 310. The locking lever 432 remains in this pivoted position through the action of the zero-resetting rod 433.

During the descent, the depth measuring device 321 measures the depth and displays it with the aid of the depth hand 307.

In parallel, the sensor device 423 causes cam 408 to advance and trigger the chronograph at a given depth, for instance at 3 meters (FIG. 24).

At the start of diving, the safety flag S 389 is arranged so as to face window 309, but is hidden by toothed sector 370 (FIGS. 28 and 29). At a predetermined depth, pin 393 swings the bent arm 390 as well as the safety flag S 389 toward the retracted position illustrated in FIG. 30.

The two hands 307 and 308 advance jointly down to the maximum depth, while cam 408 is fully outside (FIGS. 25, 26).

During the reascent, maximum-depth hand 308 remains in the position of maximum depth while the depth hand turns anticlockwise indicating the instantaneous depth (FIG. 31).

At a predetermined depth of for example 5 meters, pin 394 of the intermediate disk 363 swings bent arm 390 as well as the safety flag S 389 into their active position in which the safety flag 389 appears in window 309 (FIG. 32), while the diving flag 443 is visible in window 310 during the entire dive. The diver can then make his safety stop.

During reascent, cam 408 reenters progressively into the crown. When it has reached the position illustrated in FIG. 24 that corresponds to a given depth, it produces a second impulse onto strip 427 of the chronograph in order to automatically stop the chronograph.

At the end of the dive the diver will read the maximum depth attained from the maximum-depth hand 308, and the diving time as given by the chronograph. The zero resetting can then be done by pressing push-piece 313.

The maximum-depth hand 308 and the toothed sector 370 are then reset to their initial or rest positions (FIGS. 27 and 33). The toothed sector 370 again covers the safety flag S in window 309, and the maximum-depth hand 308 moves underneath the depth hand 307. The locking lever 432 maintains the first lever 420 locked, thus inhibiting an automatic triggering of the chronograph. The second bent arm 440 is pivoted so that the diving flag 443 is swung away from window 310. The chronograph and its indicator organs are reset to zero in known fashion.

During a free dive or under other conditions, an automatic triggering and stopping of the chronograph are not desired. It will then not be necessary to actuate the release lever 316. The diving watch measures and displays even under these conditions, at any rate the instantaneous depth and the maximum depth such as shown in FIGS. 29 to 32.

The chronograph diving watch thus comprises two separate but interactive mechanisms, a first mechanism including the measurement and display of instantaneous and maximum depth and the setting of a safety flag, and a second mechanism for the automatic triggering and stopping of the chronograph under the control of an independent pressure sensing device as well as the setting of a diving flag.

Manual zero resetting is jointly effective for the two mechanisms when the second mechanism is switched on.

It is clearly understood that the embodiments described hereinabove are in no way of a limiting character, and that they may receive any modifications desirable within the scope defined by claim 1. In particular, the two embodiments of measuring devices acting upon the slide could be used alone or in combination with the sensor that is integrated into the crown. This sensor could equally well be used alone or in combination with other measuring devices acting upon the slide. The mechanisms of transmission with their transmission elements linking the piston or pistons with the indicator devices or control organs of the chronograph could be conceived in a different way.

The devices indicating depth could be of quite another type than hands, they could for example be rotating disks or rings.

The devices indicting depth could be single or double, that is, with a permanent instantaneous and/or maximum indication.

Other flags or markers could be incorporated to indicate other particulars,

Rather than providing the ramps or cams on the circular slide, they could equally well be mounted on the piston and cooperate with cam followers provided on the circular slide.

The Belleville washer could be replaced by any other restoring element such as one or several coil springs.

The wheel with pawl and the pawl could be replaced by any other releasable unidirectional locking device, such as a smooth wheel cooperating with a clutch.

The watch movement is preferably mechanical, but could equally well be electronic, electrical, or mixed.

The pressure sensor mechanism could be used to actuate any other pressure-dependent function, for example the display of a maximum depth not to be exceeded during a dive. This sensor mechanism could be active in descent or ascent, or in one direction only.

The invention claimed is:

1. A chronograph watch comprising a mechanical sensor mechanism (141, 324) of the external pressure, characterized by the fact that this mechanical sensor mechanism (141, 324) cooperates, via a transmission mechanism (144, 419) with activation and/or deactivation means (125, 427) of a mechanical chronograph mechanism of the watch, so as to start and/or stop the chronograph mechanism automatically as a function of the external pressure.

2. The chronograph watch according to claim 1, characterized by the fact that the mechanical sensor mechanism (141, 324) comprises a cam (119, 408) designed to transmit, via the transmission mechanism (144, 419), to the said activation and/or deactivation means (125, 421) a first control impulse during an increase of the external pressure and a second control impulse during a decrease of the external pressure.

3. The chronograph watch according to claim 1, characterized by the fact that the cam (119, 408) is fast with a movable element (112, 406) of the mechanical sensor mechanism (141, 324).

4. The chronograph watch according to claim 1, characterized by the fact that the mechanical sensor mechanism (141, 324) is located in a crown (103, 314) of the chronograph watch, and by the fact that the movable element (112, 406) is slidingly mounted with respect to a stem (126, 405) of the crown.

5. The chronograph watch according to claim 1, characterized by the fact that the transmission mechanism (144, 419) comprises at least one lever.

6. The chronograph watch according to claim 5, characterized by the fact that the transmission mechanism (144, 419) comprises a first lever (104, 420) cooperating with the movable element (112, 406) of the mechanical sensor mechanism and a second lever (105, 424) cooperating with the activation and/or deactivation means (125, 427) of the mechanical chronograph mechanism.

7. The chronograph watch according to claim 1, characterized by the fact that the activation and/or deactivation means (125, 427) of the mechanical chronograph mechanism comprises a control strip.

8. The chronograph watch according to claim 1, characterized by the fact that the watch further comprises a pusher (312) for manually starting and stopping the mechanical chronograph mechanism.

9. The chronograph watch according to claim 1, characterized by the fact that the mechanical sensor mechanism (141, 324) delivers, via the transmission mechanism (144, 419) an impulse to the activation and/or deactivation means (125, 427) of the mechanical chronograph mechanism when the external pressure corresponds to a predetermined depth in water.

10. The chronograph watch according to claim 9, characterized by the fact that the predetermined depth is comprised between 3 and 5 meters.

11. The chronograph watch according to claim 1, characterized by the fact that it comprises further a locking device (327) activable by a user that locks the transmission mechanism in a first position and releases the transmission mechanism in a second position.

12. The chronograph watch according to claim 11, characterized by the fact that the locking device (321) operates to place a flag (443) in a window (310) to indicate whether the watch is in a state in which the chronograph mechanism can be started and/or stopped automatically as a function of the external pressure or not.

* * * * *